United States Patent
Wilson et al.

(10) Patent No.: US 10,737,447 B2
(45) Date of Patent: Aug. 11, 2020

(54) APPARATUS AND METHOD FOR FORMING FIBER REINFORCED COMPOSITE STRUCTURES

(71) Applicant: SHORT BROTHERS PLC, Belfast (GB)

(72) Inventors: Robert Samuel Wilson, Belfast Down (GB); Oran Walsh, Belfast Down (GB)

(73) Assignee: SHORT BROTHERS PLC, Belfast (GB)

( * ) Notice: Subject to any disclaimer, the term of this patent is extended or adjusted under 35 U.S.C. 154(b) by 610 days.

(21) Appl. No.: 15/303,622

(22) PCT Filed: Apr. 14, 2015

(86) PCT No.: PCT/GB2015/051125
§ 371 (c)(1),
(2) Date: Oct. 12, 2016

(87) PCT Pub. No.: WO2015/159062
PCT Pub. Date: Oct. 22, 2015

(65) Prior Publication Data
US 2017/0028653 A1    Feb. 2, 2017

Related U.S. Application Data

(60) Provisional application No. 61/962,312, filed on Apr. 14, 2014.

(51) Int. Cl.
*B32B 3/24* (2006.01)
*B29C 70/54* (2006.01)
(Continued)

(52) U.S. Cl.
CPC ........ *B29C 70/543* (2013.01); *B29C 37/0067* (2013.01); *B29C 65/4835* (2013.01);
(Continued)

(58) Field of Classification Search
CPC .................. Y10T 428/24033; B32B 3/266
See application file for complete search history.

(56) References Cited

U.S. PATENT DOCUMENTS 3,184,353 A   5/1965   Balamuth et al.
3,834,832 A   9/1974   Mallinder et al.
(Continued)

FOREIGN PATENT DOCUMENTS

CA   2832652 A1   10/2012
CN   2584830 Y    11/2003
(Continued)

OTHER PUBLICATIONS

Chinese Office Action dated Nov. 3, 2017, for Chinese Patent Application No. 201580019835.4.
(Continued)

*Primary Examiner* — William P Watkins, III
(74) *Attorney, Agent, or Firm* — Karceski IP Law, PLLC

(57) ABSTRACT

A control rod for incorporation into a composite assembly with at least a first composite preform, a second composite preform, and a cured resin includes a shaft defining an axis, wherein the shaft is disposable within an aperture in the composite assembly, and a plurality of threads disposed on at least a portion of the shaft. The shaft is made from, among other materials, a thermoplastic material. The threads define a thread pitch that encompasses more than one individual fiber layer forming at least one of the first composite layer and the second composite layer.

21 Claims, 15 Drawing Sheets

(51) Int. Cl.
  *B29C 65/56* (2006.01)
  *B29C 65/00* (2006.01)
  *B29C 37/00* (2006.01)
  *B29C 65/48* (2006.01)
  *B29C 65/72* (2006.01)
  *B29C 70/30* (2006.01)
  *B29C 70/48* (2006.01)
  *B32B 3/26* (2006.01)
  *B32B 5/26* (2006.01)
  *B32B 7/08* (2019.01)
  *B29L 31/30* (2006.01)
  *F16B 5/02* (2006.01)
  *B29K 63/00* (2006.01)
  *B29K 307/04* (2006.01)

(52) U.S. Cl.
  CPC .......... *B29C 65/562* (2013.01); *B29C 65/564* (2013.01); *B29C 65/72* (2013.01); *B29C 66/112* (2013.01); *B29C 66/131* (2013.01); *B29C 66/1312* (2013.01); *B29C 66/474* (2013.01); *B29C 66/52441* (2013.01); *B29C 66/721* (2013.01); *B29C 70/30* (2013.01); *B29C 70/48* (2013.01); *B32B 3/266* (2013.01); *B32B 5/26* (2013.01); *B32B 7/08* (2013.01); *B29C 66/7212* (2013.01); *B29K 2063/00* (2013.01); *B29K 2307/04* (2013.01); *B29L 2031/3076* (2013.01); *B32B 2260/023* (2013.01); *B32B 2260/046* (2013.01); *B32B 2262/106* (2013.01); *B32B 2605/18* (2013.01); *F16B 5/02* (2013.01)

(56) References Cited

U.S. PATENT DOCUMENTS

| | | | |
|---|---|---|---|
| 4,065,340 | A | 12/1977 | Dickerson |
| 4,786,343 | A | 11/1988 | Hertzberg |
| 4,920,449 | A | 4/1990 | Covey |
| 5,076,880 | A | 12/1991 | Spengler et al. |
| 5,354,160 | A | 10/1994 | Pratt et al. |
| 5,314,282 | A | 12/1994 | Murphy et al. |
| 5,832,594 | A | 11/1998 | Avila |
| 5,863,634 | A | 1/1999 | Caballero Rodriguez et al. |
| 5,868,886 | A | 2/1999 | Alston et al. |
| 5,876,832 | A | 3/1999 | Pannell |
| 5,968,639 | A | 10/1999 | Childress |
| 7,138,028 | B2 | 11/2006 | Burpo et al. |
| 7,258,828 | B2 | 8/2007 | Fish |
| 7,686,908 | B2 | 3/2010 | Misciagna et al. |
| 7,871,486 | B2 | 1/2011 | Xie et al. |
| 7,897,095 | B2 | 3/2011 | Raeckers |
| 7,972,698 | B2 | 7/2011 | Miller et al. |
| 8,128,775 | B2 | 3/2012 | Maheshwari et al. |
| 8,214,981 | B2 | 7/2012 | Hethcock et al. |
| 8,215,885 | B2 | 7/2012 | Meisner et al. |
| 8,221,666 | B2 | 7/2012 | Mikkelsen et al. |
| 8,636,455 | B2 | 1/2014 | Wehmeister et al. |
| 8,652,371 | B2 | 2/2014 | Smith et al. |
| 8,795,578 | B2 | 8/2014 | Millar et al. |
| 2003/0019567 | A1 | 1/2003 | Burpo et al. |
| 2003/0190455 | A1 | 10/2003 | Burgess et al. |
| 2004/0141827 | A1 | 7/2004 | Dicke |
| 2004/0195453 | A1 | 10/2004 | Gaitonde |
| 2005/0006823 | A1 | 1/2005 | Merrick |
| 2005/0146076 | A1 | 7/2005 | Alexander et al. |
| 2005/0186051 | A1 | 8/2005 | Keech |
| 2005/0224655 | A1 | 10/2005 | Guittard et al. |
| 2005/0260058 | A1* | 11/2005 | Cassagne, III ...... F16B 23/0061 411/402 |
| 2006/0068170 | A1 | 3/2006 | Hanson |
| 2008/0297967 | A1 | 12/2008 | Winter et al. |
| 2009/0047100 | A1 | 2/2009 | Keener |
| 2010/0080952 | A1 | 4/2010 | Suzuki et al. |
| 2010/0121475 | A1 | 5/2010 | Lyons |
| 2010/0287776 | A1 | 11/2010 | Dantou et al. |
| 2012/0015167 | A1 | 1/2012 | Beraud et al. |
| 2012/0025020 | A1 | 2/2012 | Plithides et al. |
| 2012/0231107 | A1 | 9/2012 | Waldrop et al. |
| 2013/0240150 | A1 | 9/2013 | Suzuki et al. |
| 2013/0316120 | A1 | 11/2013 | Anderson et al. |

FOREIGN PATENT DOCUMENTS

| | | | |
|---|---|---|---|
| DE | 3640208 A1 | | 4/1987 |
| FR | 2974867 A1 | | 11/2012 |
| GB | 2316036 A | | 2/1998 |
| JP | H02074325 A | | 3/1990 |
| JP | H03286841 A | | 12/1991 |
| WO | WO 9712738 | | 4/1997 |
| WO | WO 03031159 A1 | | 4/2003 |

OTHER PUBLICATIONS

AZTEX Inc.—Paper prepared on Z-Fiber® Technology (undated).
Users' Platform—Successful Parters, "Sandwich for Lightweight Structures", JEC Composite, pp. 1-2, No. 7, Feb.-Mar. 2004.
Lawlor et al., "Characterisation of Damage Development in Bolted Composite Joints," pp. 1-11 (undated).
Ratcliffe et al., Discrete Spring Model for Predicting Delamination Growth in Z-Fiber Reinforced DCB Specimens, National Research Council, pp. 1-35 (undated).
Navy Mantech Manufacturing Technology Program, Z-Pin Reinforcement of Co-Cured Composite Joints (Aug. 1998).
Z-Fiber™ Preforms, Through-Thickness Reinforcement, Aztex Inc., 2000.
Navy Topic: N86-132 (NAVAIR/NSWC) Stronger Composite Structures (undated).
International Search Report and Written Opinion for PCT Application No. PCT/GB2015/051125 dated Jan. 9, 2015.

* cited by examiner

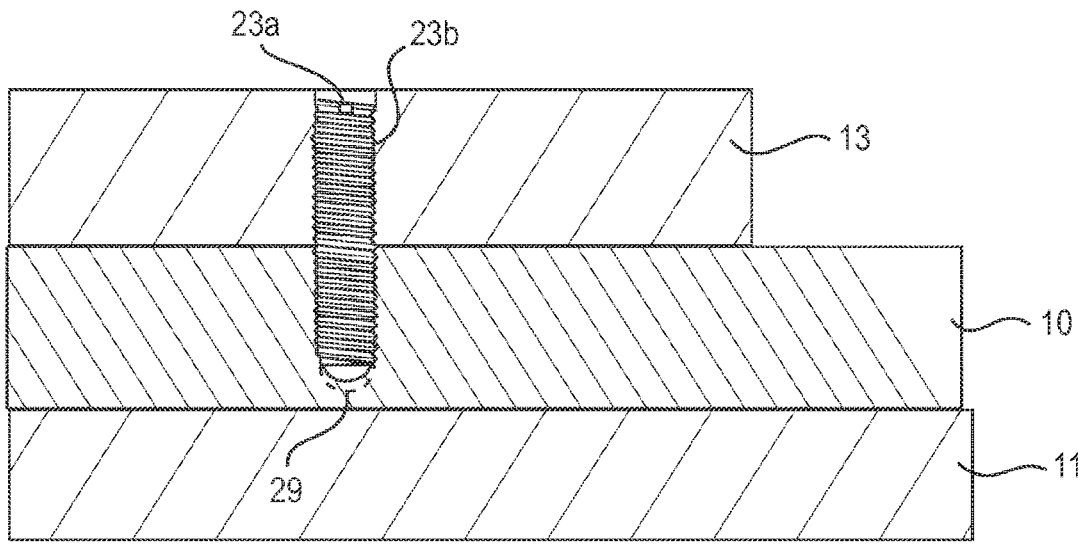
FIG. 5AA
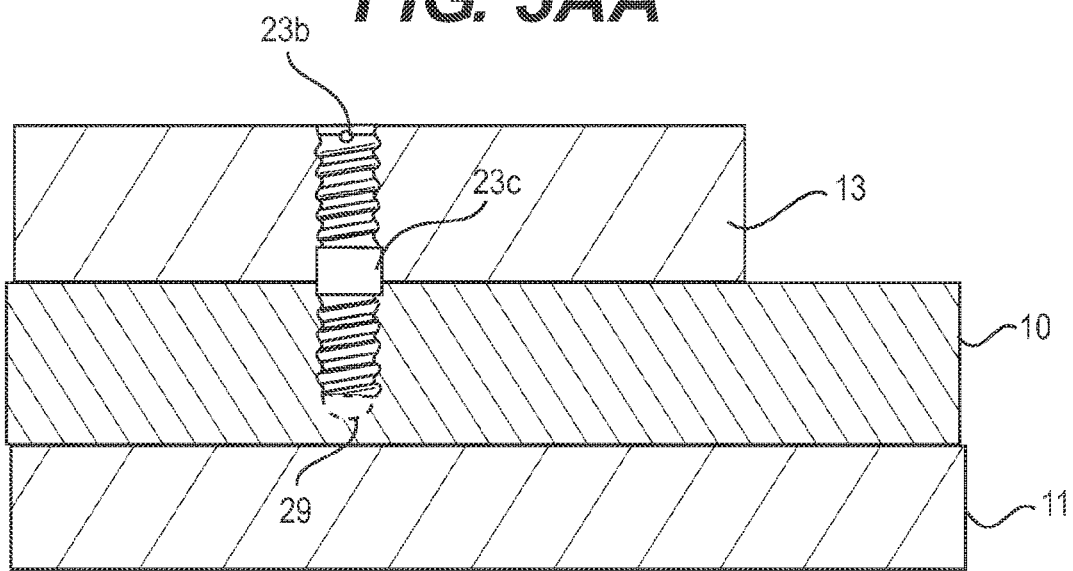
FIG. 5AAA
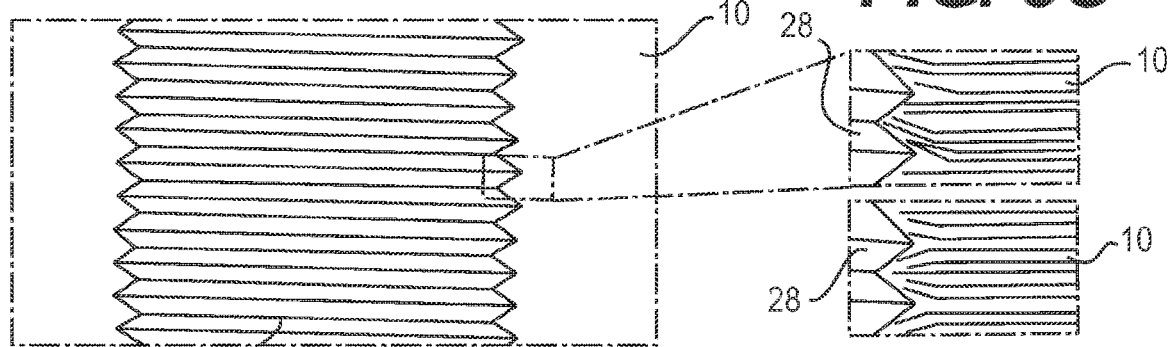
FIG. 5B   FIG. 5C   FIG. 5D

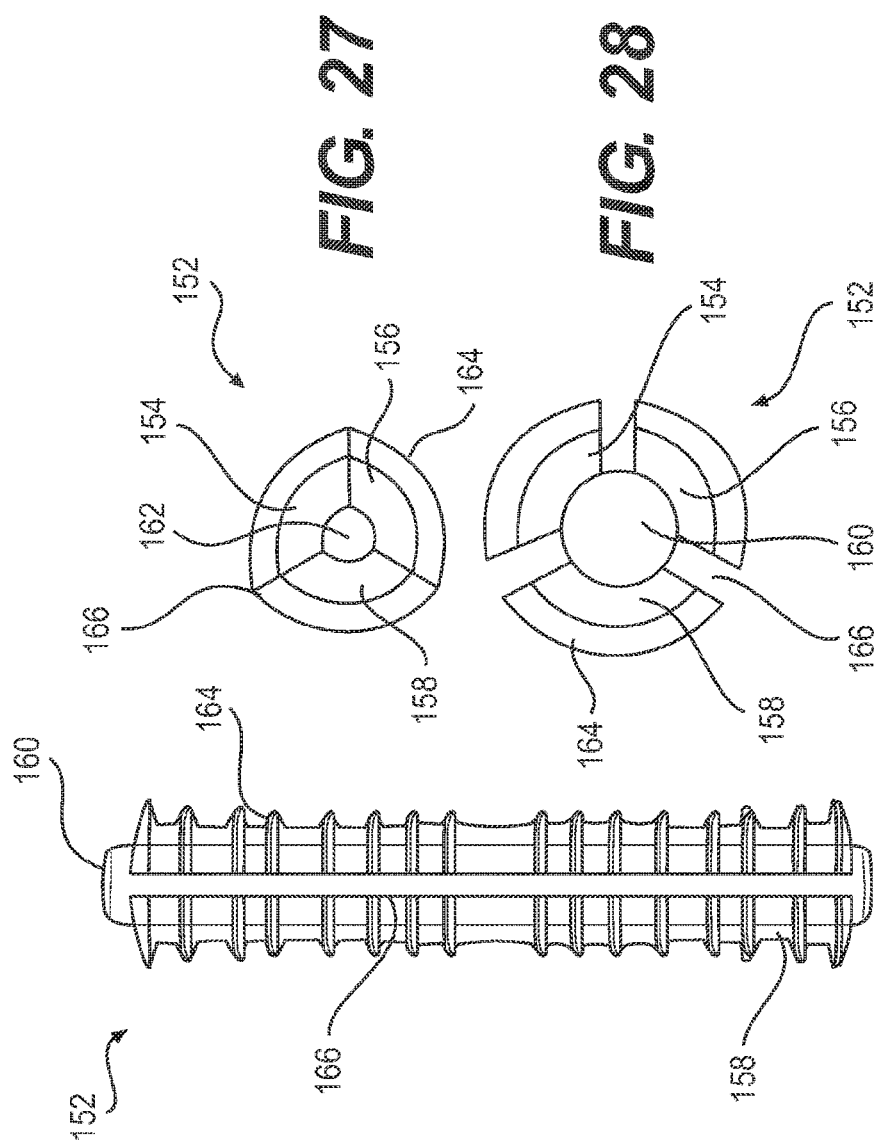

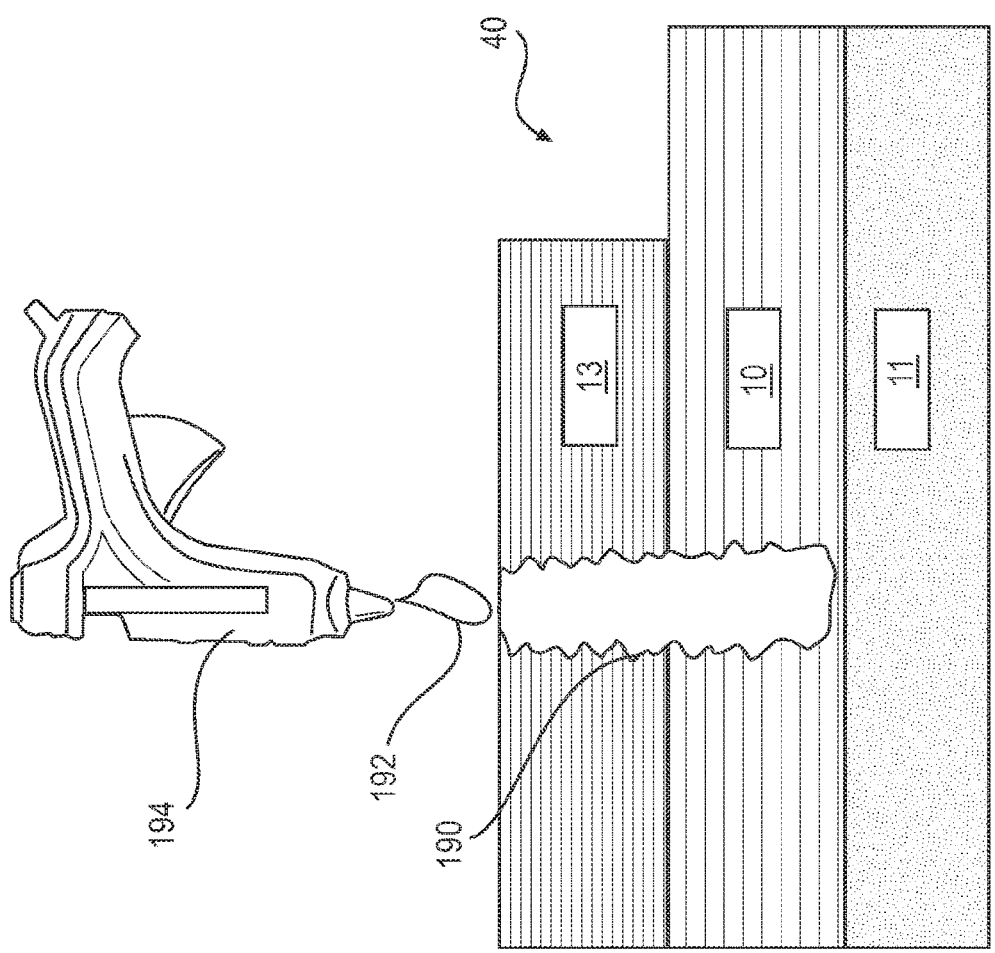

APPARATUS AND METHOD FOR FORMING FIBER REINFORCED COMPOSITE STRUCTURES

CROSS-REFERENCE TO RELATED APPLICATION(S)

This is a National Stage Entry into the United States Patent and Trademark Office from International PCT Patent Application No. PCT/GB2015/051125, having an international filing date of Apr. 14, 2015, and which claims priority to U.S. Provisional Patent Application No. 61/962,312, filed 14 Apr. 2014, the entire contents of both of which are incorporated herein by reference.

This application relates to, but does not rely for priority on, U.S. patent application Ser. No. 12/669,563, which was filed on 18 Jan. 2010 as a National Stage Entry into the United States Patent and Trademark Office from International PCT Patent Application No. PCT/GB2007/002750, having an international filing date of 19 Jul. 2007, the entire contents of both of which are incorporated herein by reference.

FIELD OF THE INVENTION

This invention concerns an apparatus for and method of forming a fiber reinforced composite structure having at least two components conjoined, the structure being formed by providing the components in the form of reinforcing fibrous preforms, locating them face to face on or between hard base tool surfaces, injecting a liquid resin into the fibrous preforms and curing the resin to form the composite structure.

DISCUSSION OF RELATED ART

The use of advanced composites, specifically carbon/epoxy materials for the manufacture of, for example, airframe structures, has, in recent years, been used significantly more commonly for both commercial and military aircraft. The object has been to produce lightweight, corrosion and fatigue resistant structures. Specifically, weight reductions of between 15% and 25% have been achieved due to improved strength and stiffness, and this has resulted in considerably reduced maintenance and inspection costs as a result of the improved fatigue resistant properties achieved. The technique enables the production of smooth aerodynamic profiles while avoiding the high tooling costs incurred in producing metallic components with complex three dimensional curvature.

Autoclave cured "pre-pregs," i.e., individual fibrous components which are preimpregnated with resin and then assembled as required, have been developed but traditionally are costly to manufacture and incur process difficulties.

Consequently, laminating processes have been developed which involve infusion of low viscosity structural resin into "dry" carbon fiber preforms which are preformed layers of carbon fibers fixed in predetermined orientations. Such processes are often referred to as "resin transfer molding" and "resin transfer infusion." Typical structures to be produced in this way are wing and stabilizer structures for aircraft, in which, for example, it may be required to produce a wing skin with spaced, generally parallel stiffeners such that the skin and the stiffeners must be securely fastened together in such a way as to avoid undue stresses in the finished components, and wherein the need to utilize material-expensive and time consuming procedures with large numbers of mandrels applied to the structure during production, is avoided.

High dimensional accuracy in the formation of such components is achievable with the resin transfer molding process which uses hard matched tooling to both faces of the tool. In this process one or more dry fibrous preforms are firstly compressed in a mold cavity formed by upper and lower matched hard tooling parts. Liquid resin is then injected into the mold cavity under pressure with the intention of fully impregnating the preforms. If two components are involved then these are formed together with accuracy owing to the matched tooling parts. The injection of liquid resin may be carried out with or without vacuum assistance.

Because of the hard tooling on both faces of the preforms, the resin is injected edgewise into the fibrous preform and must therefore infuse through the entire preform to achieve complete wet out. There are limitations to the resin transfer molding process. These include:

a) considerable costs incurred for the two-part hard tooling, particularly for large components;
b) the dimensional accuracy and relative positioning of the finished components, which depends upon the compressibility of the fabric preforms coupled with the tooled stiffness, the matching accuracy of the tool and the injection pressure;
c) the time taken to enable complete infusion of the preforms may be outside the usable resin injection time;
d) the forces imposed on the tooling edges can be high during tool closing, leading to possible damage, thickness variation or movement of the preforms;
e) perfect matching of the upper and lower tools (the sealing and high vacuum integrity of the tool can be difficult to achieve especially for complex and large components); and
f) unless the coefficients of thermal expansion of the tool parts and the preforms are closely matched, the dimensional accuracy may be compromised.

Since the alternative resin transfer infusion process described in specification GB 2316036 uses a flexible, usually elastomeric, bagging blanket which cooperates with a single hard based tool to form the sealed enclosure, some of the aforementioned difficulties are overcome. In this case, the preform, with or without a further preform component, is laid up on the base tool and the flexible blanket is applied over the preform, the whole assembly being placed in an oven, autoclave, or press-clave. Vacuum is applied to the area inside the bag to evacuate air from the preform while liquid resin is allowed to be drawn into the preform. The flexible upper tooling provided by the blanket helps facilitate resin infusion across the upper surface of the preform in contrast to the resin transfer molding process which is largely edge infusion. Thus, larger and more complex components can be formed using the RTI process.

However, the use of flexible upper tooling makes it difficult to attain accurate final thickness of the component, since the flexible blanket takes up a final position dependent upon various factors, including the quantity of resin required, the aerial weight of the fabric, the resin rheology, gel and cure characteristics, the vacuum level in the preform prior to injection, the resistance offered by the blanket and the external pressure applied, and the wet out efficiency of the fibrous preform. This difficulty can be avoided largely by incorporating thickness control plates and spacer rods.

In addition, where two fibrous preforms are superimposed beneath the blanket, it is necessary to ensure that the components remain in the correct disposition and do not suffer relative movement during resin infusion. Accurate positioning has been achieved by using a complex and expensive matrix of removable mandrels to determine the relative positions of the components prior to and during resin infusion.

SUMMARY OF THE INVENTION

It is an object of the present invention to avoid the use of such mandrels by providing alternative means for ensuring location and relative disposition of the preform components.

Accordingly an apparatus for forming a fiber reinforced resin composite structure may have at least two components, comprising a hard base tool which presents a tool face having a lay-up region for lay-up of a first reinforcing fiber preform; a second tooling element which presents a second tool face over the lay-up region to locate a second reinforcing fiber preform against the first reinforcing fiber preform; a flexible bagging blanket for overlying the lay-up region and cooperating with the tool faces to form a sealed enclosure which encloses the first and second reinforcing fiber preforms; a liquid resin source; and a liquid resin inlet which communicates with the sealed enclosure and which is connected to the liquid resin source for injection of liquid resin into the sealed enclosure to form a liquid resin/reinforcing fiber preform system for liquid resin impregnation of the reinforcing fiber preforms; characterized by at least one rigid control rod inserted in a bore so as to pass at least partially through the first and second reinforcing fiber performs to maintain the relative disposition of said preforms during the liquid resin injection.

A vacuum outlet may communicate with the sealed enclosure and which is adapted in use to be connected to vacuum generating means to create at least a partial vacuum within the sealed enclosure.

The, or each, control rod may be permanently inserted within the preforms.

The, or each, control rod may be removably inserted within the preforms.

Said at least two components may have co-planar surfaces disposed face-to-face.

The, or each, control rod may pass completely through a part of one of the preforms and only partially through a part of the other.

The, or each, control rod may pass completely through respective parts of both preforms.

A spacer rod may pass through a part of one of the preforms and abut the adjacent face of the other.

Said at least one control rod may be at least partially threaded and disposed so as to fasten the components together prior to resin injection.

At least one of the preforms may be pre-drilled to receive the, or each, at least partially threaded control rod, the diameter of the, or each, pre-drilling in at least one of the preforms being equivalent to the minimum diameter of the thread of the rod.

The, or each, threaded control rod may be threaded throughout its length.

The pre-drilling may be to a depth less than the length of the rod to be inserted therein, thus to leave a pre-drilled zone free for resin filling.

The, or each, control rod, or at least one of a plurality thereof, may be metallic.

The, or each, control rod, or at least one of a plurality thereof, may be formed as a reinforcing fiber preform.

The apparatus for forming a fiber reinforced resin composite structure as aforesaid, may be provided in combination with an autoclave adapted to contain and enclose an assembly comprising the hard base tool, the second tooling element, the reinforcing fiber preforms and the flexible bagging blanket.

A method of forming a fiber reinforced resin composite structure having at least two components, may comprise the steps of providing a hard base tool which presents a tool face having a lay-up region for lay-up of a first reinforcing fiber preform, providing a second tooling element which presents a second tool face over the lay-up region to locate a second reinforcing fiber preform against the first fiber reinforcing preform, providing a flexible bagging blanket overlying the lay-up region and cooperating with the tool faces to form a sealed enclosure enclosing the first and second reinforcing fiber preforms, injecting a liquid resin into the sealed enclosure to form a liquid resin/reinforcing fiber preform system causing liquid resin impregnation of the reinforcing fiber preforms; and allowing the resin to cure; characterized by the pre-insertion of at least one rigid control rod in a bore so as to pass at least partially through the first and second reinforcing fiber preforms to maintain the relative disposition of said preforms during the liquid resin injection.

At least a partial vacuum may be created within the sealed enclosure.

The, or each, control rod may remain permanently inserted within the preforms.

The, or each, control rod may be removed from the preforms after curing.

The components may have co-planar surfaces and be disposed face-to-face within the enclosure.

The method may include the step of enclosing the assembly comprising the hard based tool, the preforms and the flexible bagging blanket, within an autoclave in which a predetermined pressure is established during resin injection and subsequent thereto for curing.

In one aspect, the present invention provides a control rod for incorporation into a composite assembly comprising at least a first composite preform, a second composite preform, and a cured resin that includes a shaft defining an axis, wherein the shaft is disposable within an aperture in the composite assembly and a plurality of threads disposed on at least a portion of the shaft. The shaft is made from a material, such as a thermoplastic material. The threads define a thread pitch that encompasses more than one individual fiber layer forming at least one of the first composite layer and the second composite layer.

It is contemplated that the threads may be helically disposed around the shaft at a predetermined thread angle.

It is also contemplated that the threads may be annularly disposed around the shaft, forming parallel rings spaced along the axis of the shaft.

The shaft may include a top end with a head defining a keyway.

The shaft may include at least two expandable portions disposed adjacent to one another.

In one contemplated embodiment, the control rod may include a locking rod insertable between the expandable portions so that the threads engage walls of the aperture.

The shaft may include at least three expandable portions disposed adjacent to one another.

It is also contemplated that the control rod may have a first portion of threads that are helically disposed around a portion of the shaft at a predetermined thread angle and a second portion of threads that are annularly disposed around expandable portions of the shaft, forming parallel rings spaced along the axis of the expandable portions of the shaft.

The control rod is contemplated to be constructed so that a top end that is removable therefrom.

It is contemplated that the control rod is made from a material with a melting point higher than a curing temperature of the resin.

The shaft may be provided with a top end with a slot therein. If so, the slot may accommodate at least one of an Allen key or a screwdriver so that the control rod may be driven into the aperture.

It is contemplated that the control rod may have an unthreaded part disposed along at least a portion of the shaft. If so, the unthreaded part may be located between two threaded parts along the shaft.

It is contemplated that the unthreaded part may be disposed along a portion of the shaft intended to be located at a mating surface between the first preform and the second preform.

The control rod may have a countersunk head at a top end thereof.

In one contemplated embodiment, the control rod may be pre-treated with a release agent.

The present invention also provides for a composite assembly that includes a first composite layer, a second composite layer disposed atop the first composite layer, an aperture penetrating through the entirety of the second composite layer and at least partially through the first composite layer, a resin impregnating the first composite layer and the second composite layer, and a control rod disposed within the aperture the control rod comprising a shaft defining an axis and a plurality of threads disposed on the shaft, extending outwardly from the shaft wherein the shaft comprises a thermoplastic material and wherein the threads define a thread pitch that encompass more than one individual fiber layer forming at least one of the first composite layer and the second composite layer.

Aspects of the control rod listed above also are contemplated to apply to the composite assembly of the present invention.

The present invention also provides for a method of assembling of a composite assembly. The method includes assembling the composite assembly by laying a second composite layer onto a first composite layer, drilling an aperture into the composite assembly, the aperture extending completely through the second composite layer and at least partially through the first composite layer, inserting a control rod into the composite assembly, the control rod comprising a shaft defining an axis and a plurality of threads disposed on the shaft, extending outwardly from the shaft, where the shaft is made from a thermoplastic material, and where the threads define a thread pitch that encompass more than one individual fiber layer forming at least one of the first composite layer and the second composite layer, and curing the composite assembly with the control rod inserted into the aperture.

The method also may include removing a top end of the control rod so that the control rod is at least flush with a surface of the composite assembly.

The top end of the control rod may be removed such that the control rod forms a dimple in the surface of the composite assembly.

The control rod may be made from a material with a melting point higher than a curing temperature of the resin.

The present invention also provides for a composite assembly. The composite assembly includes a first composite preform, a second composite preform in communication with the first composite preform, a third composite preform in communication with the first composite preform and having a portion that overlaps the second composite preform, and a control rod extending through the third composite preform, the second composite preform and at least partially through the first composite preform in a region where the third composite preform overlaps the second composite preform, wherein the control rod may be made from a thermoplastic material.

Aspects of the control rod listed above are contemplated to apply to this embodiment of the composite assembly.

The composite assembly may be constructed so that the first composite preform, the second composite preform, and the third composite preform are co-cured together with the control rod in place.

In addition, the control rod may secure the first composite preform, the second composite preform and the third composite preform together in an axial direction of the control rod.

Additional aspects of the present invention will be made apparent from the discussion that follows.

BRIEF DESCRIPTION OF THE DRAWINGS

Embodiments of the invention will now be described, by way of example only, with reference to the accompanying drawings, in which:

FIGS. 5AA and 5AAA are enlarged part-sectional views showing alternative fasteners for the two components illustrated in FIGS. 3 and 4;

FIGS. 5B to 5D are further enlarged views of a threaded portion of the fastener in situ;

FIG. 26 is a side view of yet another contemplated embodiment of a control rod according to the present invention;

FIG. 27 is an end view of the control rod illustrated in FIG. 26, with the expansion rod removed from the center thereof;

FIG. 28 is an end view of the control rod illustrated in FIG. 26, with the expansion rod inserted into the center thereof;

FIG. 32 is a cross-sectional side view of the insertion of a liquid control rod into a hole into the composite preform stack.

DETAILED DESCRIPTION OF EMBODIMENT(S) OF THE INVENTION

Figure 1:
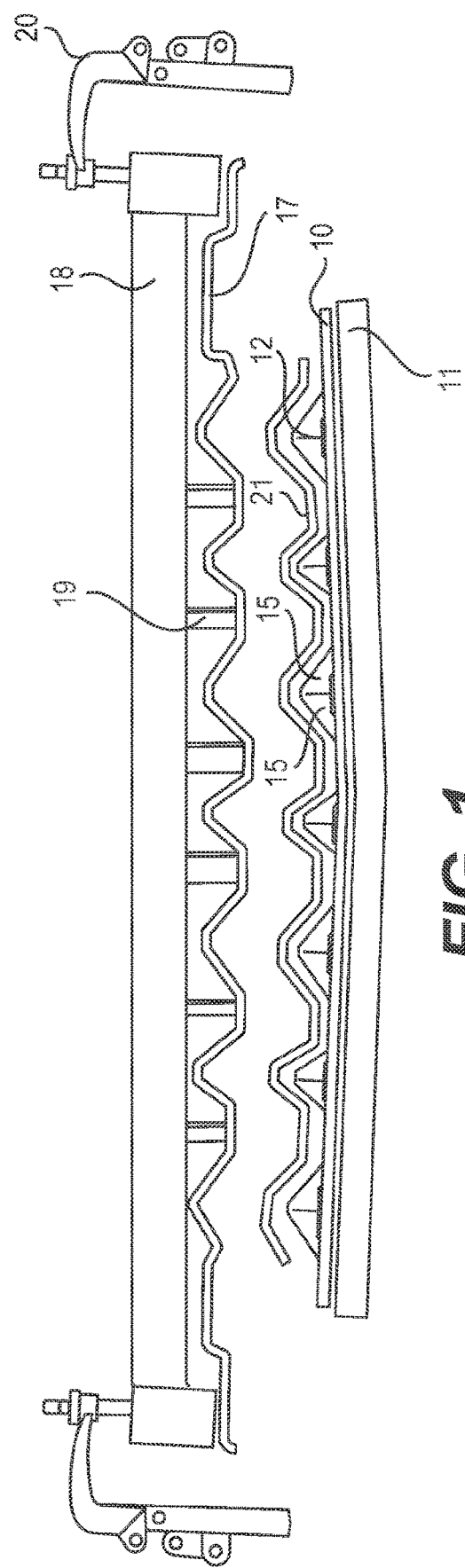
FIG. 1 schematically illustrates a conventional system for forming a fiber reinforced composite structure such as an aircraft wing with spars or cross-members.
Figure 2:
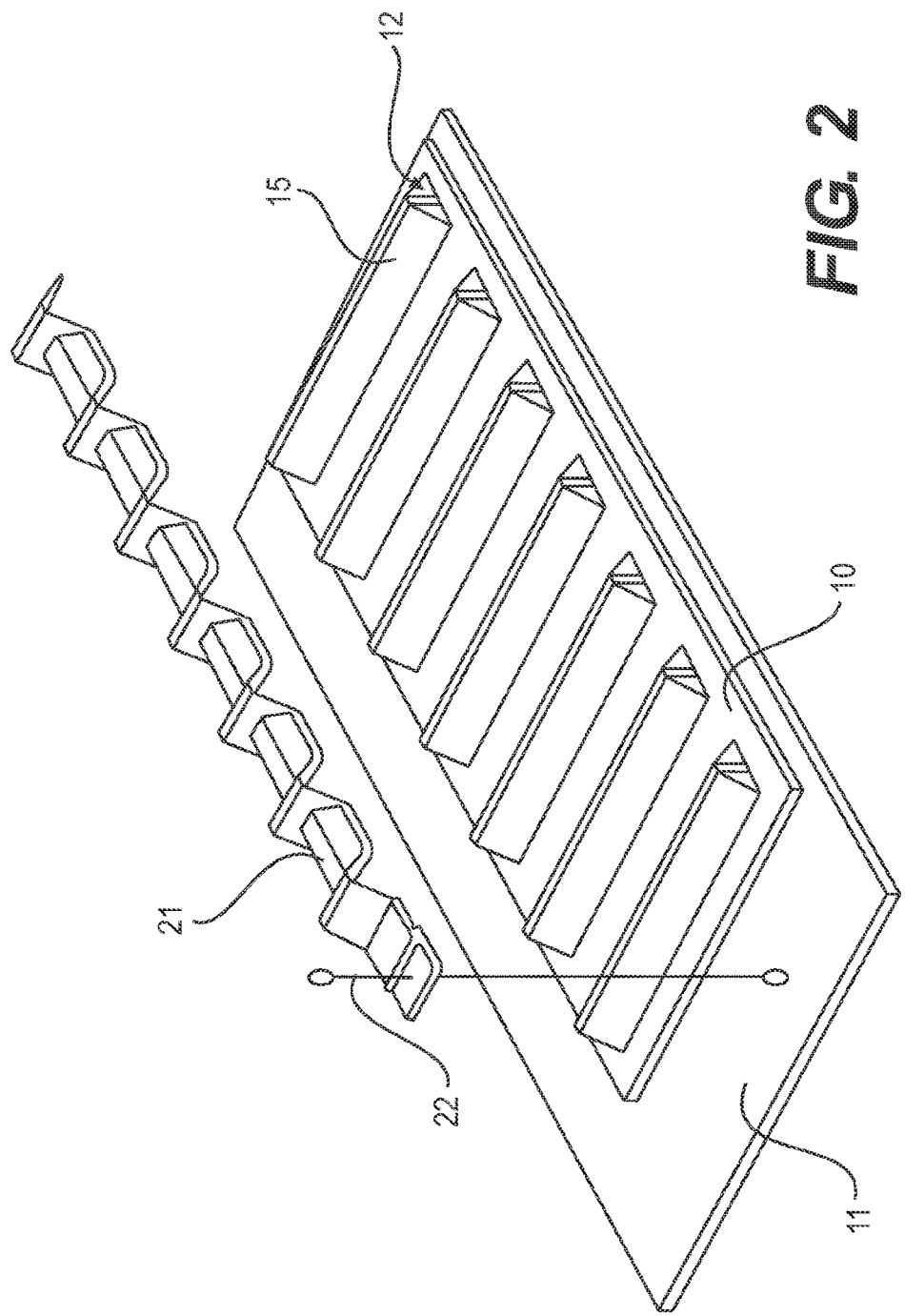
FIG. 2 isometrically illustrates parts of the system of FIG. 1.

Referring now to FIGS. 1 and 2, in a conventional system a first reinforced fiber preform 10 to be used, for example, in the construction of an aircraft wing skin, is placed on a hard base tool 11 configured to represent the required curvature for the first preform 10. Stiffeners 12 are then placed face to face upon the preform 10 and each stiffener 12 consists of a flange 13 (seen clearly in FIG. 3) and an upstanding web 14 substantially perpendicular to the flange 13. Each stiffener 12 is overlaid with a two-part upper tool 15.

A duct 16 (see FIG. 3) is provided for the supply of liquid resin to the preforms 10 and 12 whereby resin may be injected into the fibrous structure of the two preforms so that they become fully impregnated during the formation process. The duct 16 may be located (as is considered typical) at the ends of the stiffener connecting to the cavity above the upper flange in the two-part upper tool 15 and around the preform perimeter.

A flexible bagging blanket 17 is disposed beneath a support structure 18 with bars 19 to cause the bagging blanket to form over and around the preforms 10 and 12 during resin injection. Clamping devices 20 may be provided to force the support structure 18 downwardly over the assembly of parts.

Conventionally, a complex and thus costly rib and mandrel plate system 21 has been interposed between the bagging blanket 17 and the upper surfaces of the preforms. Such a rib and mandrel plate is illustrated in FIG. 2 and this requires to be secured to the hard base tool 11 at 22.

During the resin injection process although the flexible blanket 17 locates, to some extent, the parts of the assembly in the correct disposition, however the rib and mandrel plates 21 are required to ensure accurate location at every position of the stiffeners 12, since the blanket 17, being flexible, may allow some movement during resin injection.

Several such rib and mandrel plates 21 are required across the assembly.

Figure 3:
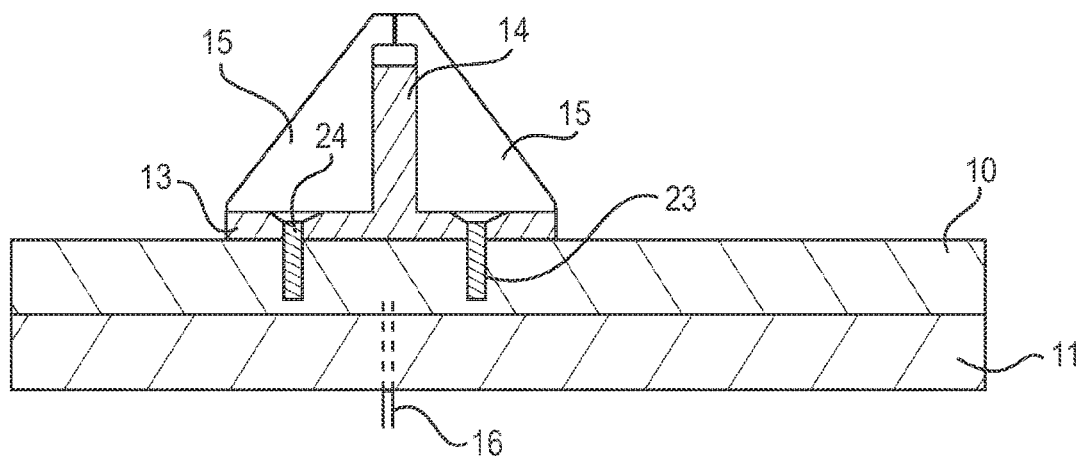
FIG. 3 is a part-sectional view of a part of a two-component composite structure.

Referring now to FIG. 3 and in accordance with a first embodiment of the invention, the rib and mandrel plates are replaced by fasteners or control rods which, permanently or removably, pass at least partially through the first and second reinforcing fiber preforms to maintain the relative disposition of said preforms during the liquid resin injection. It is noted that the term "fastener" and "control rod" are used interchangeably herein. The term "control rod" is intended to be broader than the tern "fastener," as is made apparent from the discussion that follows.

In this example a first control rod 23 passes through the flange 13 of the stiffener 12 and partially through the preform 10. The control rod 23 may be of metal or of ceramic material, or of a composite material (which includes a dry preform and/or thermoplastic material by itself or reinforced with fibers and/or particles, as discussed in greater detail below). In the example shown, a further control rod 24 of a fibrous composite material also passes through the flange 13 and partially through the preform 10. In this case, if the composite nature of the stiffener 12 (which is a preform) is not fully compacted the composite material rod 24 facilitates some small movement during resin injection. A small cavity is left beneath the rod 23 which will fill with injected resin, or which can be occupied by a small amount of "soft/dry" fiberglass, soft glass, ceramic, or other material, such as an insulator.

Where the preform 10 forms the outer skin of an aircraft wing, lightning strike protection is afforded by the fact that the control rods 23, 24 do not extend fully through the preform 10. Moreover, where provided, the small cavity left beneath the control rod 23, may help to insulate against lightning strikes. As noted, the small cavity may be filled with resin, "soft/dry" fiberglass, soft glass, ceramic, an insulator, a dielectric, or other material as required or as desired.

Figure 4:
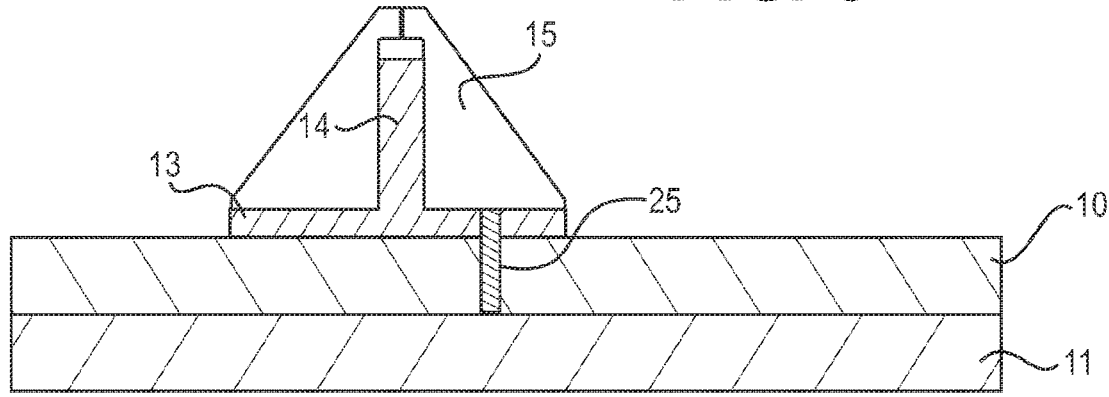
FIG. 4 is a similar view showing a different embodiment from the one illustrated in FIG. 3.

Referring now to FIG. 4, in a further embodiment a control rod 25 extends fully through the preform 10 and through the flange 13 thereby controlling the movement of the preform 10 and stiffener 12 combination.

Figure 5A:
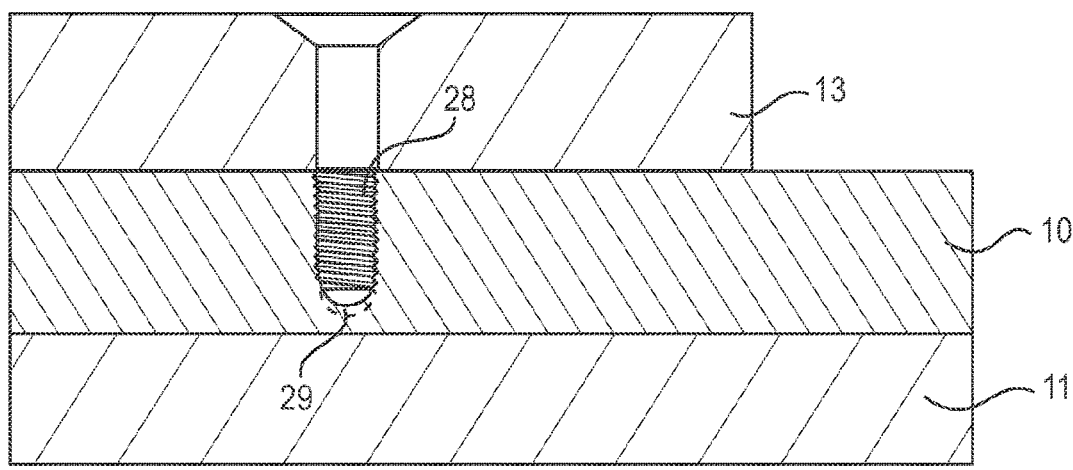
FIG. 5A is an enlarged part-sectional view showing a fastener for the two components illustrated in FIGS. 3 and 4.

Referring now to FIG. 5A, each of the control rods 23, 24, 25 of FIGS. 3 and 4 may be formed with a threaded portion 28 so that the control rod 23, 24, 25 acts as a fastener which not only prevents relative sliding movement of the preform 10 and the flange 13 but also securely fastens the two together in an axial direction of the control rod 23, 24, 25.

Referring now to FIG. 5AA, each of the control rods 23, 24, 25 of FIGS. 3 and 4 may be formed as a completely threaded rod 23a having a slot 23b for a screwdriver or Allen key to drive the threaded rod 23a into place. This form of control rod 23, 24, 25 is appropriate for use in joints which are principally subject to a shear load. The entire threaded length of the control rod 23, 24, 25 supports whatever minor tensile loads may exist.

Referring now to FIG. 5AAA, the controls rod 23, 24, 25 of FIGS. 3 and 4 may be formed with a non-threaded central portion 23c to provide increased strength to shear loads as compared with the threaded rod 23a of FIG. 5AA.

Where a threaded rod 23a of this kind is used, an aperture is pre-drilled through the flange 13 and partly through the preform 10 to allow the threaded rod 23a to be inserted. The predrilling is such as to leave a small gap 29 beyond the end of the rod 23, 24, 25 for consolidation of resin during injection and the rod 23, 24, 25 is installed under slight axial tension also to facilitate consolidation. Gap 29 may be filled with insulation material such as ceramic or glass fibers (or a suitable dielectric material) to improve electrical isolation for lightning strike protection purposes. It will be appreciated that the rod 23, 24, 25 is inserted with the components in a dry condition, i.e., prior to resin injection, and may incorporate a release interface to facilitate removal if required.

FIG. 5A includes a diagrammatic rectangular portion which is shown enlarged in FIG. 5B, and FIG. 5C shows, further enlarged, how the dry fibers are forced into the thread 28 of the rod 23, 24, 25 so that after resin injection the fibers may become partially re-aligned, as can be seen in FIG. 5D. When the infused resin surrounds and cures the threads 28 of the rod 23, 24, 25, a perfect match is achieved. The term "perfect match" is not intended to limit the present invention. It is meant to convey that there is a zero tolerance (or near zero tolerance) established between the rod 23, 24, 25, the fibers, and the resin.

Figure 6:
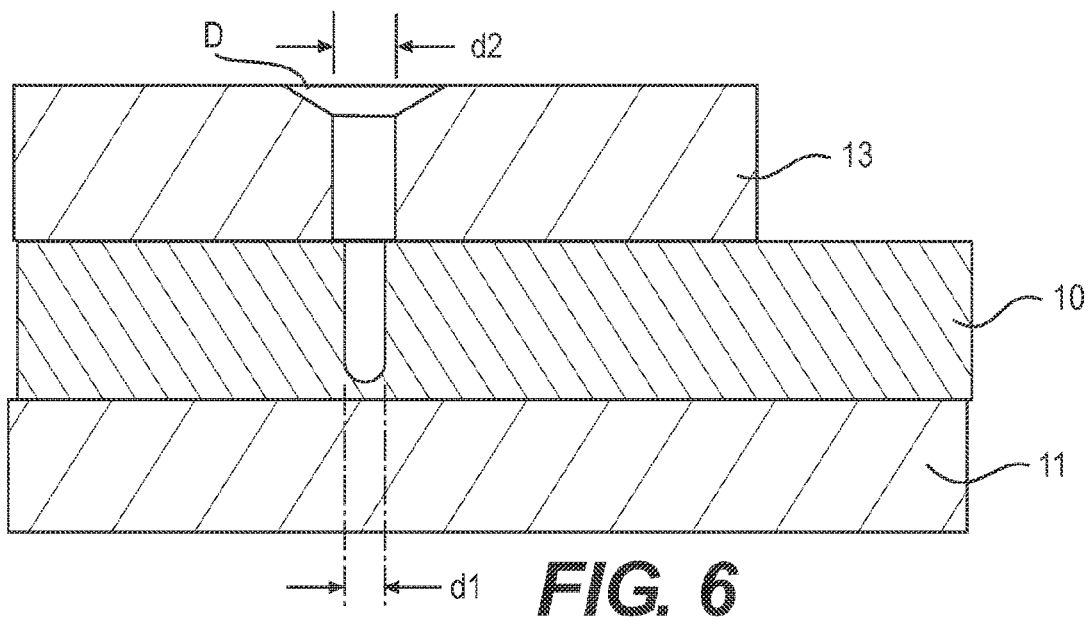
FIG. 6 is a view showing a drilled aperture for receipt of the fastener.

FIG. 6 illustrates the pre-drilling of the assembly at a first diameter d1 to accommodate the threaded part 23a of the rod 23, 24, 25 and a second, larger diameter to receive the unthreaded part 23c. The reduced diameter d1 is equivalent to the inner diameter d2 of the threaded part. The flange 13 is also countersunk at D in the case where a rod 23, 24, 25 with a countersink head is used.

Figure 7:
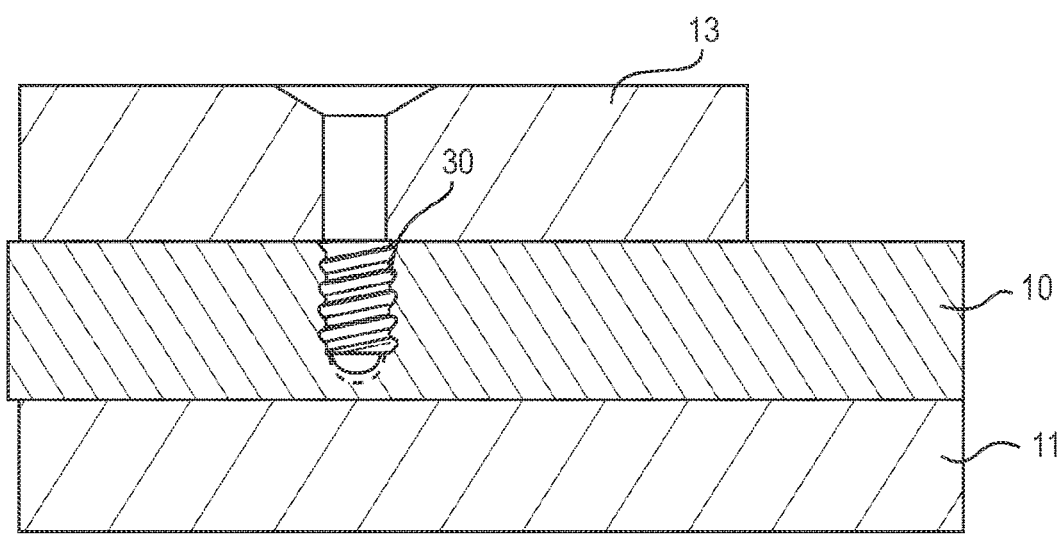
FIG. 7 shows a different form of the fastener.

Referring now to FIG. 7 there is shown an embodiment in which the threaded portion 30 of a control rod 23, 24, 25 has a deeper, smoother thread to minimize the risk of delamination of the preform layers, and in this case the pre-drilling will be at a uniform diameter equivalent to the inner diameter of the threads. Such a thread is shown also in FIG. 5AAA, by way of example. The form of thread may be determined to provide adequate resistance to the loading expected in service.

Figure 8:
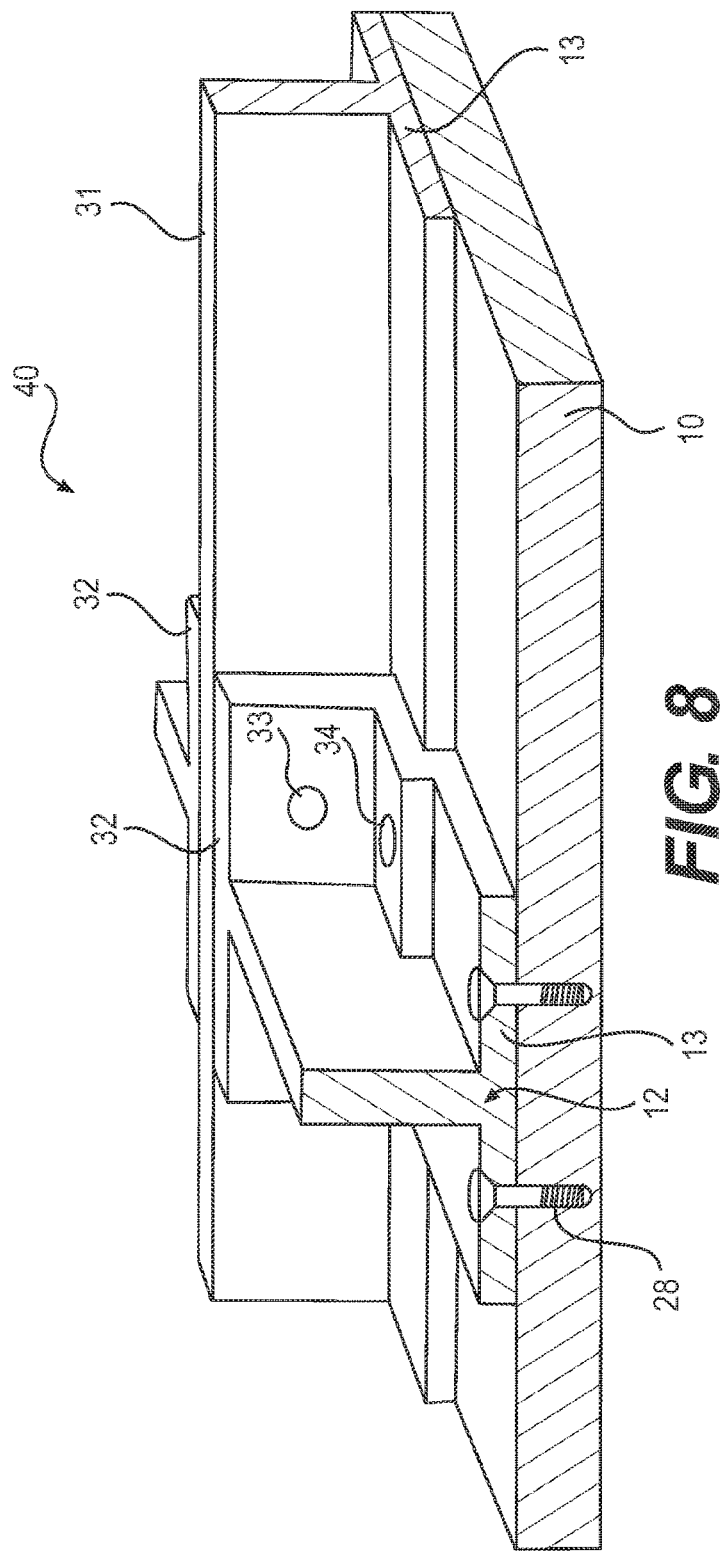
FIG. 8 illustrates a typical application of a multi-component reinforced resin composite structure made in accordance with the invention.

Referring now to FIG. 8 there is illustrated a practical application of a multi-component reinforced resin composite structure 40 comprising the preform 10 and stiffeners 12 with threaded control rods 28. This example shows a cross-stiffener 31 while the stiffeners 12 have supporting webs 32 through which are inserted further rods 33, 34. The entire assembly 40 illustrated in FIG. 8 may be formed in a single injection or multiple injection process.

As should be apparent from this illustration, the stiffeners 12 and the cross-stiffener 31 lie atop the preform 10. In this illustration, both the stiffeners 12 and the cross-stiffener 31 are T-shaped. Of course, the stiffeners 12 and cross-stiffener 31 may have any other cross-sectional shape without departing from the scope of the present invention. As illustrated, the supporting webs 32 are incorporated into stiffeners 12. As with the stiffeners 12 and cross-stiffener 31, the supporting webs 32 may have any shape without departing from the scope of the present invention.

As illustrated in FIG. 8, the stiffeners 12 extend from respective sides of the cross-stiffener 31 and are each intended to span between two cross-stiffeners 31 (not shown). The stiffeners 12 have stepped flanges 13 that abut against the top surface of the preform 10 and overlap the top surface of the flanges 13 of the cross-stiffener 31. As is apparent in FIG. 8, two supporting webs 32 are positioned on opposite sides of each of the stiffeners 12 to provide support thereto. The supporting webs 32 may be integrally formed with the stiffeners 12, or may be separate preforms. As may be apparent, only one supporting web 32, extending from one side of the stiffener 12, may be employed without departing from the scope of the present invention.

The control rods 28, 33, 34 that are illustrated in FIG. 8 (that could alternatively be constructed as any others of the control rods 23, 24, 25, etc., described herein) are disposed at least partially through two or more of the preform 10, the stiffener 12, the cross-stiffener 31, and the supporting webs 32. The control rods 28, 33, 34 connect the preform 10, the stiffener 12, the cross-stiffener 31, and the supporting webs 32 to one another. As shown in FIG. 8, and as described herein, the control rods 28, 33, 34 are contemplated to penetrate partially or wholly through the structures in which they are inserted.

While not limiting the present invention, the control rods 28 are illustrated as being inserted at least partially through the flanges 13 of the stiffener 12 and the preform 10. More specifically, the control rods 28 are shown extending through the flanges 13 of the stiffeners 12 and partially into the preform 10. Similarly, the control rods 34 are contemplated to penetrate through the flanges 13 on the stiffeners 12, the flanges 13 on the cross-stiffener 31, and partially into the preform 10. The control rods 33 penetrate at least partially through the supporting webs 32 and the cross-stiffener 31. More specifically, the control rods 33 penetrate through the supporting webs 32 and at least partially into the cross-stiffener 31. Alternatively, a single control rod 33 may extend through a first supporting web 32 on one side of the cross-stiffener 31, the cross-stiffener 31 and through a second supporting web 32 on the other side of the cross-stiffener 31. As should be apparent, the embodiments of the control rods 28, 33, 34 are merely illustrative of the different, types, orientations, and locations contemplated for the control rods 28, 33, 34, that are included in the composite structure 40.

Among other benefits, the control rods 28, 33, 34 function as mechanical fasteners that help to prevent delamination between the stiffeners 12, the cross-stiffener 31, the supporting webs 32, and the preform 10. When cured together, the stiffeners 12, cross-stiffeners 31, the supporting webs 32, and the preform 10 form the reinforced resin composite structure 40. It is contemplated that, with the application of forces along specific vectors, the reinforced resin composite structure 40 may crack and delaminate along the interfaces between the stiffeners 12, cross-stiffeners 31, the supporting webs 32, and the preform 10. The control rods 28, 33, 34 interfere with these forces, thereby helping the composite structure 40 resist cracking and delamination.

In accordance with a non-limiting embodiment, the composite structure 40 is contemplated to form the structure of an aircraft wing, where the preform 10, stiffeners 12, cross-stiffeners 31 and supporting webs 32, together with the control rods 28, 34 and 33, are co-cured together. In such an embodiment, the preform 10 acts as a wing skin, the cross-stiffeners 31 act as stringers and the stiffeners 12 and supporting webs 32 act as riblets extending between the stringers.

Figure 9:
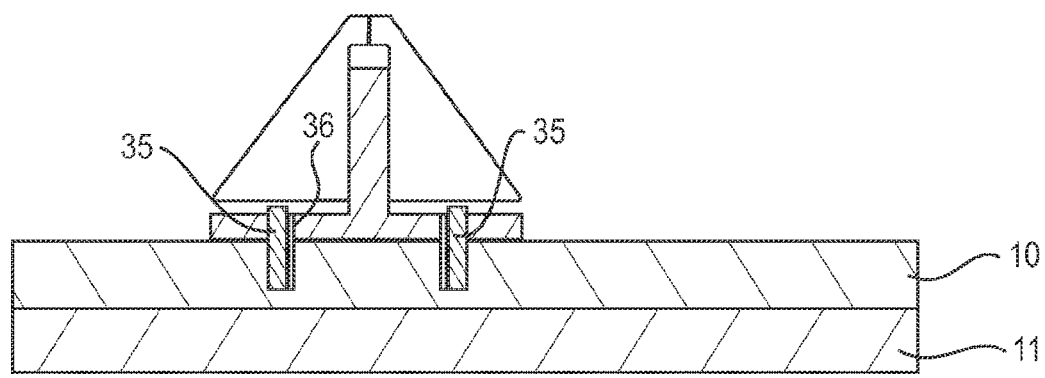
FIG. 9 shows a different form of fastener prior to formation of the structure.

Referring now to FIG. 9, there is illustrated a pair of preformed dry fiber control rods 35 in place of the rods 23, 24 of FIG. 3 and in this case the rods 35 are of reduced diameter when compared with the pre-drilled apertures 36 in which they are to be installed, but the rods are of excess length when compared with the apertures 36.

Figure 10:
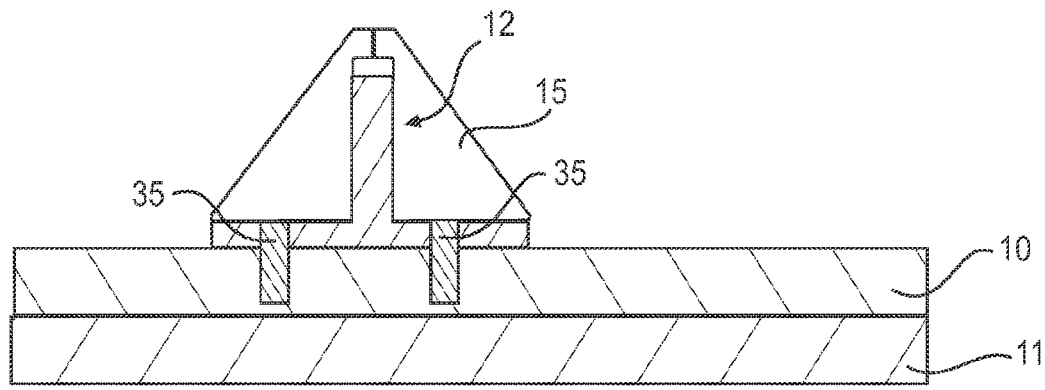
FIG. 10 is a view similar to FIG. 9, post-formation.

Referring now to FIG. 10, it will be seen that as the upper tool 15 bears against the fibrous rods 35 during resin injection, the rods 35 are compressed to fill the apertures 36 thus to achieve an interference fit of the rods 35 within their respective apertures 36. Also, some controlled movement of the parts of the assembly 40 may be afforded by use of these two compressible fiber rods 35. The arrangement illustrated in FIGS. 9 and 10 will provide increased strength of the assembly 40 both before and after resin injection.

It is not intended to limit the invention to the examples described and illustrated herein. Many different configurations of fibrous components making up the reinforced resin composite structure may be chosen as required, while the relative disposition of the two or more components is ensured by the use of at least one control rod between each adjacent pair of components which, during resin injection, ensures accurate location and relative disposition of the respective components. The, or each, rod is inserted between the components in a dry state, i.e., prior to resin injection, and so controls the positioning of the components as the resin is infused into the fibrous structure of the components.

Once the structure is completed and cured it is necessary only to remove it from the hard tooling whilst the need for complex and expensive rib and mandrel plates has been avoided.

The control rods, particularly those being at least partially threaded, may, if required, be pre-treated with a release agent so that they may be removed after formation of the structure. This is particularly useful where the structure is to be subsequently fastened to another structure or where a special kind of fastener is to be attached to the structure to receive, for example, cabling or the like. In other cases, pretreatment may assist with bonding to the preform.

Figure 11:
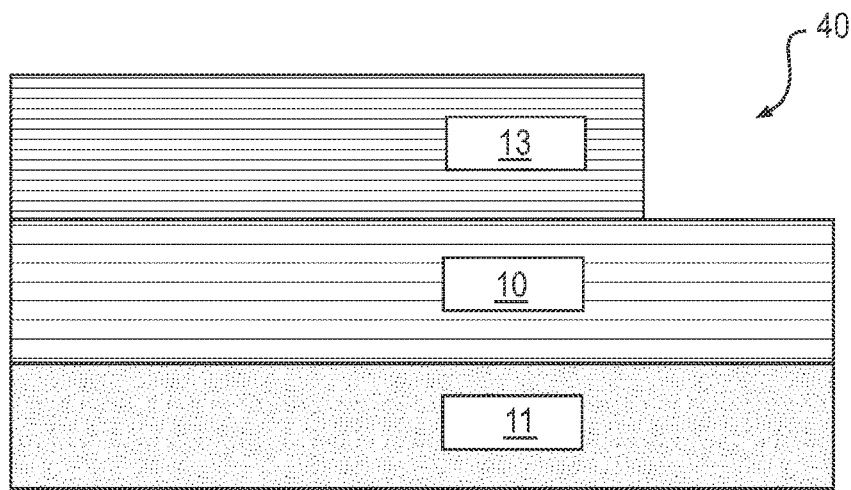
FIG. 11 is a cross-sectional, side view of a composite preform stack (e.g., dry fibers typically held together by a dry powder binder) laid up atop a base tool.

FIG. 11 is a cross-sectional side view of a portion of the multi-component reinforced resin composite assembly 40 illustrated in FIG. 8. For consistency, this view of the composite assembly 40 shows the first fiber preform 10 and a second fiber preform, such as the flange 13, overlaying the hard base tool 11.

It is noted that the composite assembly 40 is not limited to two composite fiber preforms 10, 13. To the contrary, the composite assembly 40 may include any number of composite fiber preforms 10, 13 without departing from the scope of the present invention. While the composite assembly 40 is illustrated with two composite preforms 10, 13, it is contemplated that the composite assembly 40 may combine twelve or more preforms 10, 13 together. As should be apparent from the foregoing, the preforms 10, 13 may be parts of stiffeners 12, 31 and supporting webs 32, as discussed above. It is noted that the use of the terms preforms, stiffeners, supporting webs, etc., should not be understood to limit the present invention as various composite laminate structures, regardless of the associated appellation, may be connected to one another in the manner described herein.

The composite preforms shown in the figures are illustrated using different shading patterns for the purposes of providing visual differentiation between the preforms. The different shading is not to be interpreted as being representative of different materials or different types of fiber layers. It is within the scope of the present invention for the different preforms to be formed of the same material and same types of fiber layers, or different materials and different types of fiber layers.

With reference to FIG. 11, the tool 11 may be a third layer. In particular, the designation of the tool 11 may be replaced with a supporting web 32, a cross-stiffener 31 or the like. In other words, as noted above, while FIG. 11 (and other figures) illustrates two preforms 10, 13 that abut against one another, the same figure may be relied upon to illustrate three preforms 10, 12, 13, 31, 32 in abutment against one another. As indicated herein, the composite structures of the present invention may combine two or more preforms 10, 12, 13, 31, 32 together.

Figure 12:
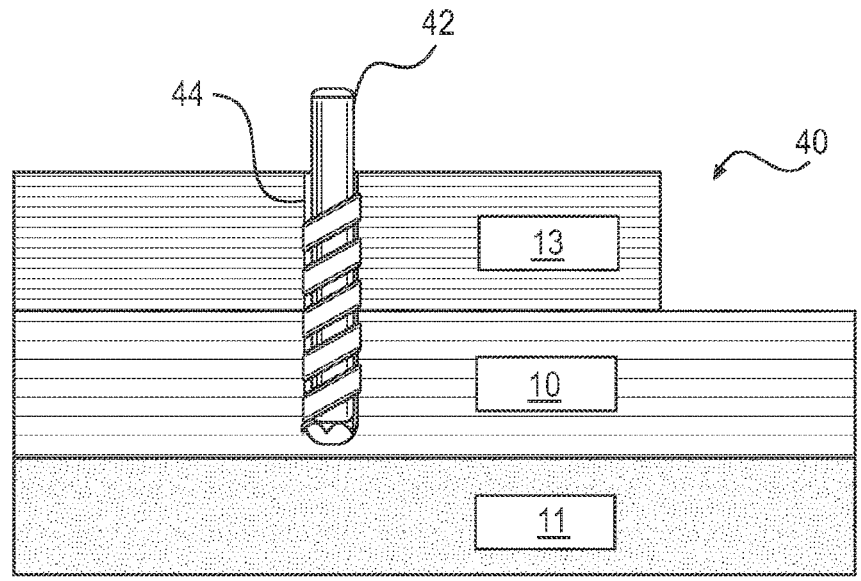
FIG. 12 is a cross-sectional, side view of the composite preform stack illustrated in FIG. 11, showing a drill bit after having bored an aperture into the composite preform stack.

FIG. 12 is a cross-sectional side view of a portion of the composite assembly 40 illustrated in FIG. 11. In this side view, a drill 42 has penetrated the first and second composite preforms 10, 13 to create an aperture 44, such as the aperture 36 illustrated in FIG. 9.

Figure 13:
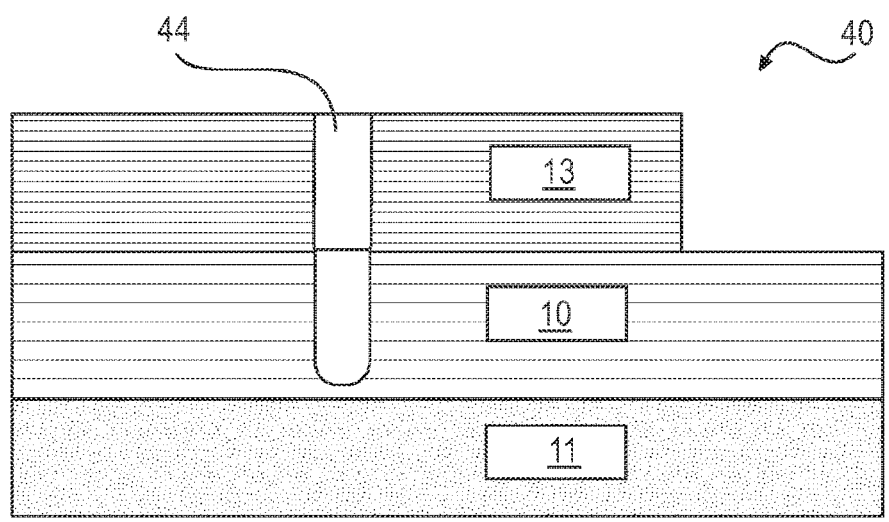
FIG. 13 is a cross-sectional, side view of the composite preform stack illustrated in FIG. 12, after removal of the drill bit from the aperture or hole.

FIG. 13 is a cross-sectional side view of the portion of the composite assembly 40 illustrated in FIG. 12. In this view, the drill 42 has been removed, leaving behind the aperture 44 bored into the first and second fiber preforms 10, 13.

Figure 14:
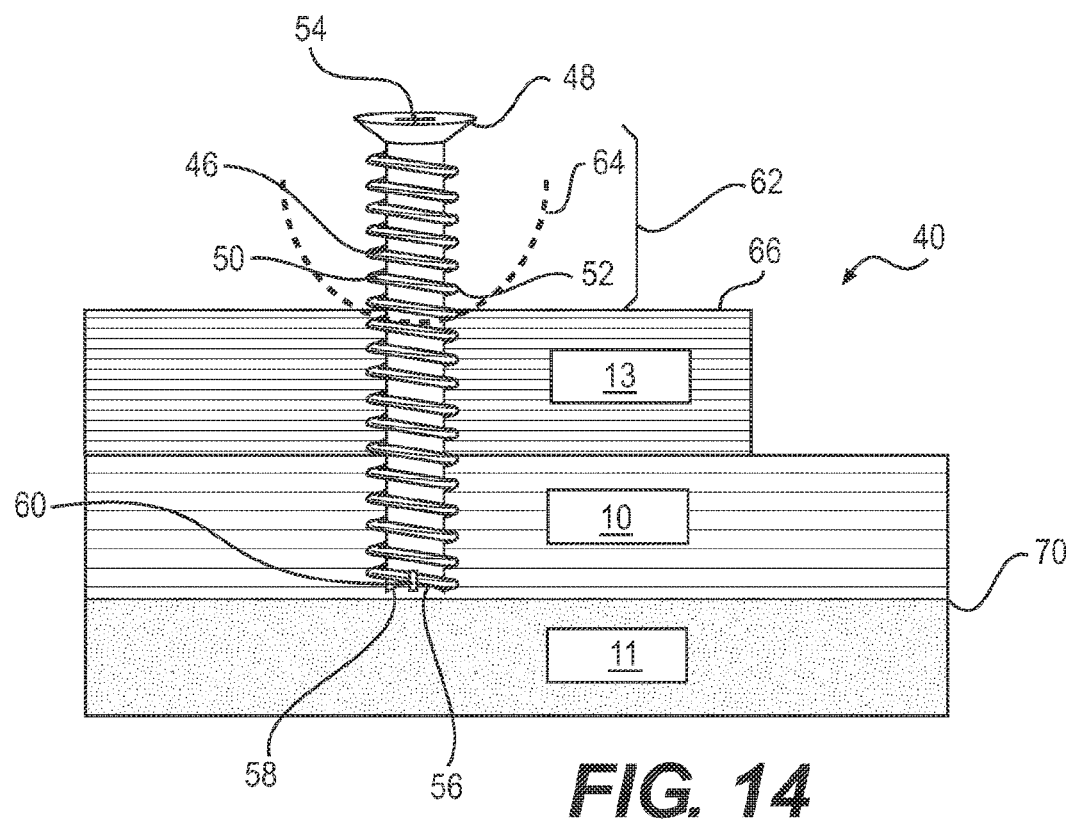
FIG. 14 is a cross-sectional, side view of the composite preform stack illustrated in FIG. 13, shown after insertion of a threaded control rod into the aperture or hole.

FIG. 14 is a cross-sectional side view of the portion of the composite assembly 40 illustrated in FIG. 13. In this view, a threaded control rod 46 has been inserted into the aperture 44. This is similar to the embodiment illustrated in FIG. 5AA, for example.

The threaded control rod 46 penetrates the first and second composite preforms 10, 13 nearly the full depth to the hard base tool 11. The control rod 46 includes a head 48, a shaft 50, and a plurality of threads 52. The head 48 at the top of the control rod 46 includes a keyway 54 that compliments a tool, such as a screw driver, an Allen wrench, or the like. The keyway 54 accommodates a tool so that the control rod 46 may be threadedly inserted into the composite assembly 10.

The bottom end of the threaded control rod 46 has a concave dimple 56. The concave dimple 56 defines a circular edge 58 at the bottom end of the control rod 46. The bottom end of the control rod 46 also includes a groove 60. The circular edge 58 and the groove 60 are provided to facilitate deformation of the bottom end of the control rod 46, which helps to prevent the control rod 46 from adversely impacting against the hard base tool 11, as discussed above, or against the hard base tool 15 discussed below.

After the control rod 46 is inserted into the composite assembly 40 to a predetermined depth, the top end 62 of the control rod 46 is removed along the dotted line 64. The top end 62 is removed so that the control rod 46 does not protrude above the top surface 66 of the composite assembly 40. This helps to prevent the control rod 46 from adversely impacting against the hard base tool 15, as discussed in connection with FIG. 15, for example.

Figure 15:
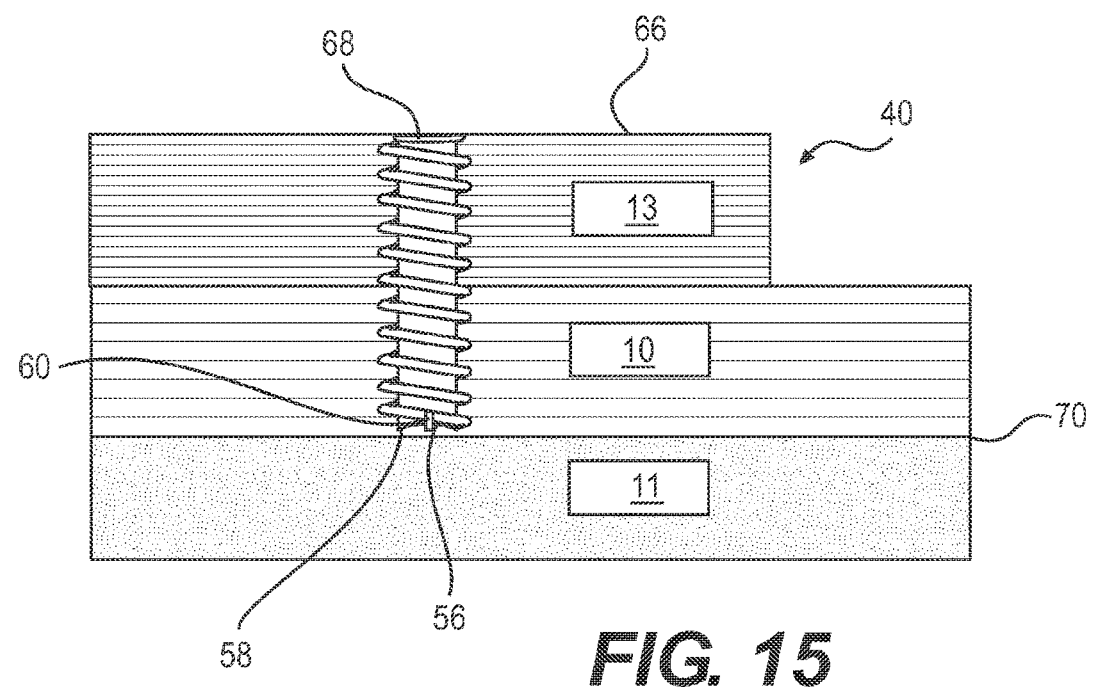
FIG. 15 is a cross-sectional, side view of the composite preform stack illustrated in FIG. 14, shown after removal of the top section of the threaded control rod.

FIG. 15 illustrates the composite assembly 40 after the top end 62 of the control rod 46 is removed. As suggested by the cut line 64, it is contemplated that the control rod 46 will be cut in a manner such that a dimple 68 defines a surface below the top surface 66 of the composite stack 40. Cutting the control rod 46 in this manner assures that the control rod 46 does not protrude above the tope surface 66 of the composite stack 40.

As noted above, after the control rod 46 is inserted into the composite stack 40, resin is injected into the composite stack 40. Given that the control rod 46 includes dimples 56, 68 at its top and bottom ends, it is contemplated that resin will occupy the dimples 58, 68, thereby assuring a smooth top surface 66 and a smooth bottom surface 70.

In connection with the control rod 46, it is contemplated that the control rod 46 is made from a material such as a thermoplastic material. As such, the thermoplastic material may be cut along the cut line 64 in the manner indicated above. The cutting tool may be of any type including, but no limited to, a heated blade that melts the thermoplastic material of the control rod 46. A thermoplastic material also is contemplated to be more malleable than other materials and, therefore, may be molded so as not to protrude above the top surface 66 or below the bottom surface 70 of the composite stack 40.

FIGS. 16-22 illustrate various embodiments of thread patterns for the control rod 23, 24, 25, 33, 34, 35, 46 of the present invention. As should be apparent the thread patterns may be applied to any of the embodiments of control rods encompassed by the present invention.

Figure 16:
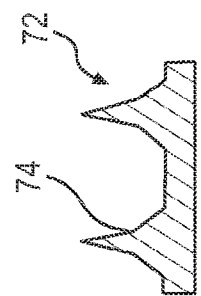
FIG. 16 is an enlarged, sectional view of a first contemplated embodiment of a thread pattern for the threaded control rod illustrated in FIG. 15.

FIG. 16 provides a cross-section of a portion of a first embodiment of a thread pattern 72 for the control rod 23, 24, 25, 33, 34, 35, 46. The thread pattern 72 includes a plurality of thread profiles 74 that include pointed tips.

Figure 17:
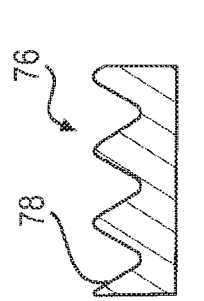
FIG. 17 is an enlarged, sectional view of a second contemplated embodiment of a thread pattern for the threaded control rod illustrated in FIG. 15.

FIG. 17 is a cross-sectional view of a portion of a second embodiment of a thread pattern 76 contemplated for the control rod 23, 24, 25, 33, 34, 35, 46 of the present invention. The thread pattern 76 includes a plurality of thread profiles 78 that are essentially V-shaped, with curved tips and troughs.

Figure 18:
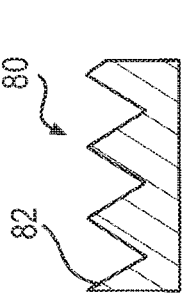
FIG. 18 is an enlarged, sectional view of a third contemplated embodiment of a thread pattern for the threaded control rod illustrated in FIG. 15.

FIG. 18 is a cross-sectional side view of a portion of a third embodiment of a thread pattern 80 contemplated for the control rod 23, 24, 25, 33, 34, 35, 46 of the present invention. The thread pattern 80 includes a plurality of V-shaped thread profiles 82 that have sharper-shaped tips and troughs, as compared with the embodiment illustrated in FIG. 17.

Figure 19:
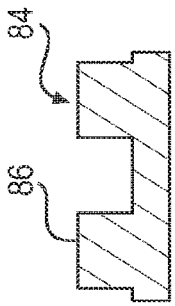
FIG. 19 is an enlarged, sectional view of a fourth contemplated embodiment of a thread pattern for the threaded control rod illustrated in FIG. 15.

FIG. 19 is a cross-sectional side view of a portion of a fourth embodiment of a thread pattern 84 for the control rod 23, 24, 25, 33, 34, 35, 46 of the present invention. The thread pattern 84 has square-shaped thread profiles 86.

Figure 20:
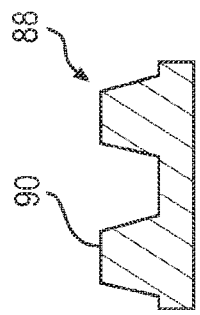
FIG. 20 is an enlarged, sectional view of a fifth contemplated embodiment of a thread pattern for the threaded control rod illustrated in FIG. 15.

FIG. 20 is a cross-sectional side view of a fifth embodiment of a thread pattern 88 contemplated for the control rod 23, 24, 25, 33, 34, 35, 46 of the present invention. The thread pattern 88 includes a plurality of trapeziodally-shaped thread profiles 90.

Figure 21:
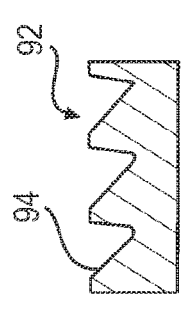
FIG. 21 is an enlarged, sectional view of a sixth contemplated embodiment of a thread pattern for the threaded control rod illustrated in FIG. 15.

FIG. 21 is a cross-sectional side view of a sixth embodiment of a thread pattern 92 contemplated for the control rod 23, 24, 25, 33, 34, 35, 46 of the present invention. The thread pattern 92 includes a plurality of skewed, V-shaped thread profiles 94.

Figure 22:
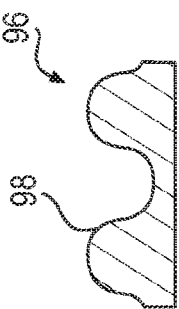
FIG. 22 is an enlarged, sectional view of a seventh contemplated embodiment of a thread pattern for the threaded control rod illustrated in FIG. 15.

FIG. 22 is a cross-sectional side view of a portion of a seventh embodiment of a thread pattern 96 contemplated for the control rod 23, 24, 25, 33, 34, 35, 46 according to the present invention. The thread pattern 96 includes a plurality of thread profiles 98 that have curved tips and troughs.

As should be apparent from FIGS. 16-22, the control rod 23, 24, 25, 33, 34, 35, 46 may include any type of thread pattern 72, 76, 80, 84, 88, 92, 96. Accordingly, the present invention should not be considered to be limited to any particular thread pattern 72, 76, 80, 84, 88, 92, 96.

Figure 23:
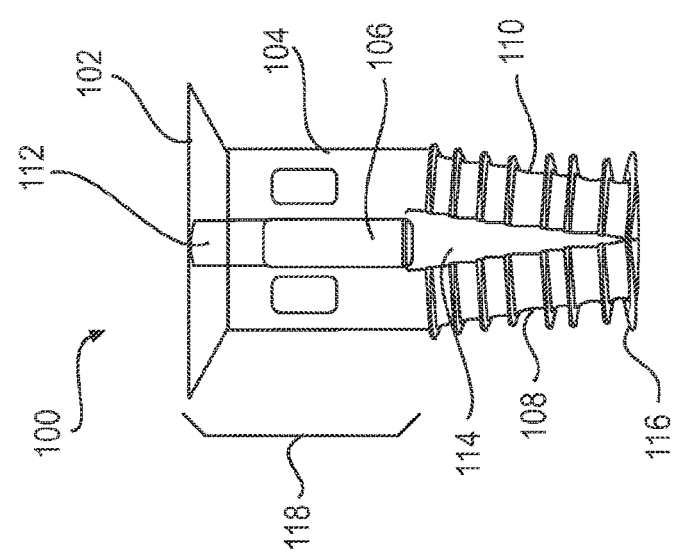
FIG. 23 is side view of another contemplated embodiment of a control rod according to the present invention.

FIG. 23 is a side view of one contemplated embodiment of a control rod 100 according to the present invention. The control rod 100 includes a head 102, an upper shaft 104, an insertable, center rod 106 (also referred to as a "locking rod" 106), a first expandable section 108, and a second expandable section 110. The control rod 100 also includes a bore 112 in the upper shaft 104 and a central gap 114 between the expandable sections 108, 110. The expandable sections include a plurality of threads 116 (also referred to as ribs 116) thereon.

The control rod 100 is contemplated to be inserted into an aperture 44, like the prior embodiments of control rods 23, 24, 25, 33, 34, 35, 46 described herein. Unlike the control rod 23, 24, 25, 33, 34, 35, 46, however, the control rod 100 is contemplated to be press-fitted into the aperture 44 in the composite stack assembly 40. As a result, the control rod 100 is not contemplated to include a keyway.

Once inserted into an aperture 44 in the composite assembly 40, a locking rod 106 may be inserted into the bore 112. Alternatively, the locking rod 106 may be pre-loaded into the bore 112 such that the control rod 100 is received in the state shown in FIG. 23. As the locking rod 106 is pressed between the first and second expandable sections 108, 110, the expandable sections 108, 110 are pushed outwardly against the walls of the aperture 44, thereby securing the control rod 110 in the aperture 44. The locking rod 106 may have any suitable length, as required or as desired for desired functioning of the control rod 100.

As noted, unlike other ones of the control rod 23, 24, 25, 33, 34, 35, 46, the control rod 100 does not include helically spiraled threads on the expandable sections 108, 110. Instead, the threads 116 are molded onto the surfaces of the expandable sections 108, 110 as parallel ribs 116. The threads 116/ribs 116 are pressed into engagement with the walls of the aperture 44 due to the insertion of the locking rod 106 into the control rod 100. As illustrated, the threads 116 may have different sizes, as required or as desired. In addition, the threads may be spaced apart from one another in a regular or a non-regular pattern, as required or as desired.

With respect to the construction of the control rod 100, it is contemplated that the control rod 100 will be made from a thermoplastic material, at least in part, like other embodiments of the control rods 23, 24, 25, 33, 34, 35, 46 of the present invention. The thermoplastic material may be reinforced, as required or as desired, with a filler material (such as a fibrous filler, a ceramic filler, a powder filler, a needle-shaped filler, or the like). The locking rod 106 also is contemplated to be made from a suitable thermoplastic material, with or without a filler material.

In the illustrated embodiment of the control rod 100, it is contemplated that the head 102 and the upper shaft 104 will be cut off in the same manner as the top end 62 of the control rod 46 is removed. If so, it is contemplated that the expandable sections 108, 110 and locking rod 106 will remain in the aperture 44 after the head 102 and upper shaft 104 are removed. For ease of reference, the head 102 and upper shaft 104 are referred to as the top end 118 of the control rod 100, consistent with the nomenclature employed in connection with the control rod 46.

Figure 24:
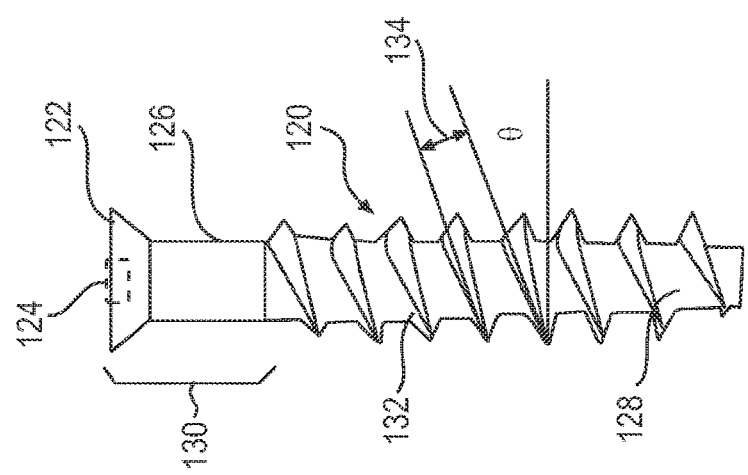
FIG. 24 is a side view of still another contemplated embodiment of a control rod according to the present invention.

FIG. 24 is a side view of still another contemplated embodiment of a control rod 120 according to the present invention. This embodiment of the control rod 120 is contemplated to be similar to the embodiment of the control rod 46 discussed above. As before, the control rod 120 is contemplated to be made from a thermoplastic material.

As illustrated in FIG. 24, the control rod 120 has a head 122 with a keyway 124. The head 122 sits atop an unthreaded portion 126 of the shaft 128. Together, the head 122 and the unthreaded portion 126 of the shaft 128 form the top end 130 of the control rod 120. Threads 132 are disposed on the shaft 128 at a pitch 134 and a pitch angle θ. The pitch 134 refers to the distance between adjacent threads 132. As should be apparent, the pitch 134 need not be the same along the entire length of the shaft 128. In addition, the pitch angle θ may be any angular value, as required or as desired. As with prior embodiments of the control rod 23, 24, 25, 28, 33, 34, 35, 46, 100, the top end 130 is contemplated to be cut off after insertion of the control rod 120 into an aperture 44 in the composite stack assembly 40.

Figure 25:
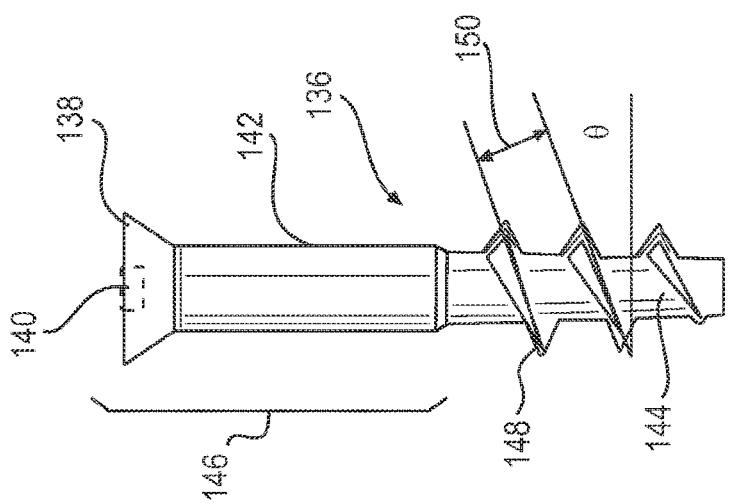
FIG. 25 is a side view of one further contemplated embodiment of a control rod according to the present invention.

FIG. 25 is a side view of another contemplated embodiment of a control rod 136. In this embodiment, the control rod includes a head 138 defining a keyway 140. The control rod 136 includes an unthreaded shaft portion 142 and a threaded shaft portion 144. The head 138 and the unthreaded shaft portion 142 define the top end 146 of the control rod 136. Threads 148 are disposed on the threaded shaft portion 144 of the control rod 136. The threads 148 have a pitch 150 and a pitch angle θ. As with prior embodiments of the control rod 23, 24, 25, 28, 33, 34, 35, 46, 100, 120, the top end 146 is contemplated to be cut off after insertion of the control rod 136 into an aperture 44 in the composite stack assembly 40.

FIG. 26 is a side view of a further contemplated embodiment of a control rod 152 according to the present invention. This control rod 152 includes at least three expandable portions 154, 156, 158 (shown in FIGS. 27 and 28) and a locking rod 160 that is inserted into a central opening 162. The expandable portions 154, 156, 158 include threads 164. The threads 164 are contemplated to be similar in construction, design, and distribution to the threads 116 discussed in connection with the control rod 100 illustrated in FIG. 23. The expandable portions 154, 156, 158 are separated from one another by gaps 166.

FIGS. 27 and 28 help to illustrate the installation of the control rod 152 in an aperture 44 in the composite assembly 40. In particular, it is contemplated that the control rod 152 will be inserted into the aperture 44 in a collapsed state, which is illustrated in FIG. 27. As shown, the central opening 162 does not include the locking rod 160. In addition, the three expandable portions 154, 156, 158 touch one another. After insertion of the locking rod 160, as shown in FIG. 28, the expandable portions 154, 156, 158 are pressed into engagement with the walls of the aperture 44. The threads 164 hold the control rod 152 in the aperture 44 in the same fashion as other embodiments of the of the control rod 23, 24, 25, 28, 33, 34, 35, 46, 100, 120, 136 of the present invention.

Figure 30:
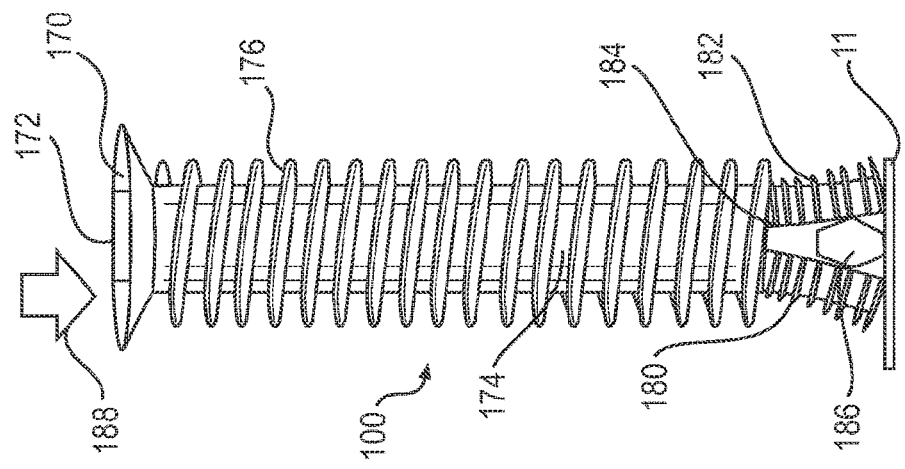
FIG. 30 is a side view of the control rod illustrated in FIG. 29, showing the expandable end in an opened condition.
Figure 29:
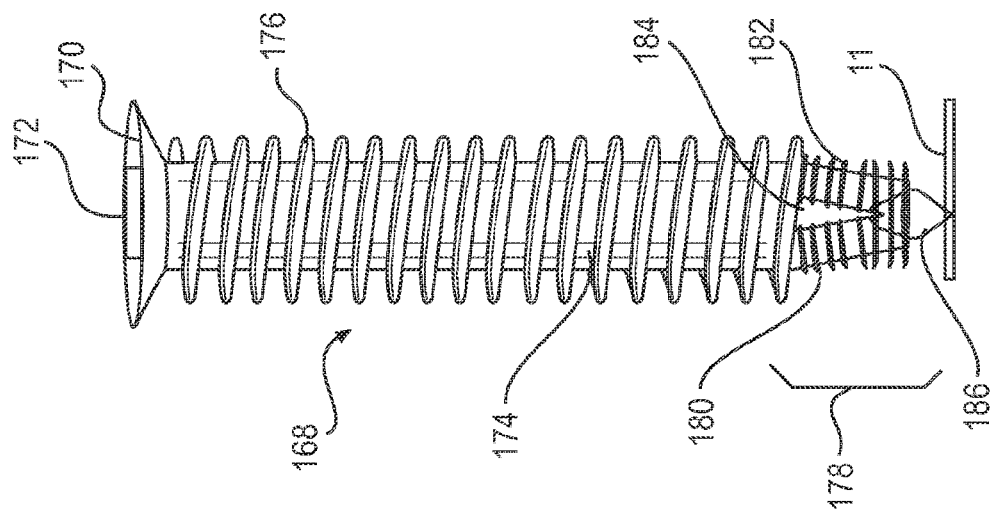
FIG. 29 is side view of still another embodiment of a control rod according to the present invention, showing the expandable end in a closed condition.

FIGS. 29-30 illustrate yet another embodiment of a control rod 168 according to the present invention. Generally speaking, this embodiment of the control rod 168 combines aspects of the control rod 46 and the control rod 100.

The control rod 168 includes a head 170 with a keyway 172. A shaft 174 extends from the head 170 and includes a plurality of helically-disposed threads 176 thereon. The bottom end 178 of the control rod 168 includes a first separable portion 180 and a second separable portion 182 that are separated from one another by a gap 184. The tips of the separable portions 180, 182 are connected to one another via a separator 186.

When the control rod 168 is inserted into an aperture 44 in the composite assembly 40, the separator 186 eventually will be pushed against the bottom end of the aperture 44. As the user continues to insert the control rod 168 into the aperture in the direction of the arrow 188, the separator 186 dislocates from the ends of the separable portions 180, 182. Once separate from the separable portions 180, 182, the separator 186 pushes against the separable portions 180, 182 to push them apart, thereby causing the separable portions 180, 182 to be forced against the side walls of the aperture 44. In this manner, the control rod 168 is further secured in the aperture 44.

Figure 31:
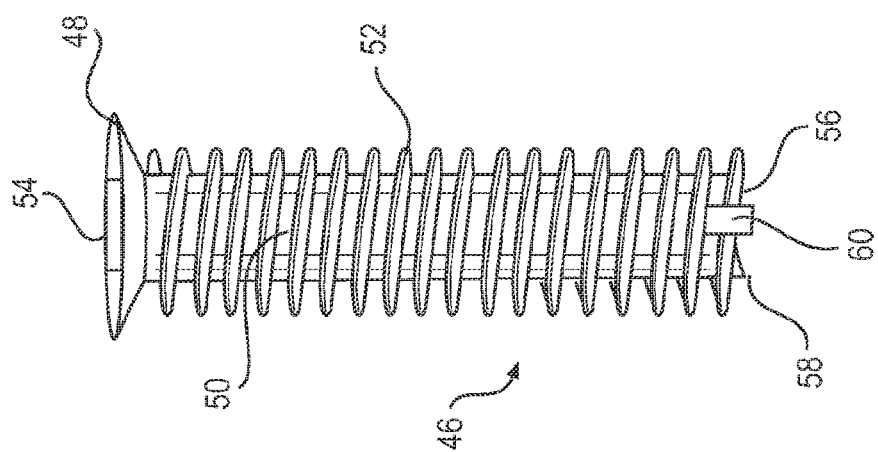
FIG. 31 is a side view of another embodiment of a control rod according to the present invention, where the liquid control rod has a sufficiently high viscosity to discourage infusion of the liquid into the preform and where the liquid control rod becomes a solid at room temperature.

FIG. 31 is an enlarged detail of the control rod 46 discussed above. Details of the control rod 46 are more readily apparent in this illustration.

FIG. 32 is a cross-sectional side view of one further illustration of a control rod 190 according to the present invention. Here, the control rod 190 is injected, in liquid form, into the aperture in the composite assembly 40 from a dispenser 192. Upon solidification, the control rod 190 is contemplated to occupy the complete volume of the aperture 44 in the composite assembly 40.

In each of the embodiments of the present invention, it is contemplated that the control rods 23, 24, 25, 28, 33, 34, 35, 46, 100, 120, 136, 168, 190 will be made from a thermoplastic material. While the term "thermoplastic material" is used herein, it is noted that the material need not qualify solely as a plastic material. It is contemplated that a wide variety of polymer materials may be employed for the control rods 23, 24, 25, 28, 33, 34, 35, 46, 100, 120, 136, 168, 190 without departing from the scope of the present invention.

In addition, as noted herein, the control rods 23, 24, 25, 28, 33, 34, 35, 46, 100, 120, 136, 168, 190 need not be made from a single material. It is contemplated that the control rods 23, 24, 25, 28, 33, 34, 35, 46, 100, 120, 136, 168, 190 may be made from several materials without departing from the scope of the present invention. For example, the control rods 23, 24, 25, 28, 33, 34, 35, 46, 100, 120, 136, 168, 190 may be made from a thermoplastic material reinforced with fiber materials including, but not limited to, carbon fibers, aramid fibers, nylon fibers, ceramic filaments, metal filaments, wires, etc. As noted above, the control rods 23, 24, 25, 28, 33, 34, 35, 46, 100, 120, 136, 168, 190 may be made from materials that include any number of filler materials without departing from the scope of the present invention.

With respect to the material(s) selected for construction of the control rods 23, 24, 25, 28, 33, 34, 35, 46, 100, 120, 136, 168, 190, there are a few variables that one skilled in the art might consider.

It is noted that the resin in the composite assembly 40 typically is cured at a temperature of less than about 180° C. Accordingly, it is contemplated that the control rods 23, 24, 25, 28, 33, 34, 35, 46, 100, 120, 136, 168, 190 will be made from a material with a melting point above 180° C. By keeping the melting point of the material for the control rods 23, 24, 25, 28, 33, 34, 35, 46, 100, 120, 136, 168, 190 above 180° C., the control rods 23, 24, 25, 28, 33, 34, 35, 46, 100, 120, 136, 168, 190 will resist melting a deformation during the resin curing process.

It is also noted that the operational temperature range for a composite assembly 40 on an aircraft is typically between −70° C. and +82° C. Accordingly, it is contemplated that the material selected for the control rods 23, 24, 25, 28, 33, 34,

35, 46, 100, 120, 136, 168, 190 will be suitable for operation within this temperature range. The material, therefore, is contemplated to resist cracking, breaking, shattering, fatiguing, degrading, etc. within this temperature range.

Since aircraft are contemplated to be in service for extended lifetimes, the material selected for the control rods 23, 24, 25, 28, 33, 34, 35, 46, 100, 120, 136, 168, 190 also may be selected for longevity. For example, a commercial aircraft may be in operational service for several decades. Therefore, it is contemplated that the material selected for the control rods 23, 24, 25, 28, 33, 34, 35, 46, 100, 120, 136, 168, 190 will remain stable throughout that same time period.

It is also contemplated that the material(s) used for the construction of the control rods 23, 24, 25, 28, 33, 34, 35, 46, 100, 120, 136, 168, 190 will withstand chemical attack from aggressive fluids including the resin. In addition, the material for the control rods 23, 24, 25, 28, 33, 34, 35, 46, 100, 120, 136, 168, 190 may be selected from compositions that resist degradation when exposed to fluids commonly found on an aircraft, such as fuel, hydraulic oil, water, acids, water vapor, etc. The material also may be selected to resist degradation from microorganisms, such as the types of microorganisms that grow in fuel, oils, and other hydrocarbons.

In addition, the material selected for the construction of the control rods 23, 24, 25, 28, 33, 34, 35, 46, 100, 120, 136, 168, 190 is contemplated to be selected so that the material bonds to the resin injected into the composite assembly 40 prior to or during the curing process. By employing a material that bonds to the resin, a strong connection is assured for the operational lifetime of the composite assembly 40.

With respect to the control rods 23, 24, 25, 28, 33, 34, 35, 46, 100, 120, 136, 168, it is contemplated that surface treatments may be applied thereto to improve adhesion between the control rods 23, 24, 25, 28, 33, 34, 35, 46, 100, 120, 136, 168 and the composite assembly 40 during the curing process. For example, one or more of the surfaces of the control rods 23, 24, 25, 28, 33, 34, 35, 46, 100, 120, 136, 168 may be abraded, provided with protrusions, include ciliations (i.e., structures that are cilia-like or hair-like), include a surface coating, have been subjected to a plasma, corona discharge, etc. As should be apparent, there are numerous ways in which the surfaces of the control rods 23, 24, 25, 28, 33, 34, 35, 46, 100, 120, 136, 168 might be modified to improve adhesion with the composite assembly 40. Those variations are intended to be encompassed by the present invention as if set forth herein.

As noted above, the control rods 23, 24, 25, 28, 33, 34, 35, 46, 100, 120, 136, 168 are contemplated to include dimples 56, 68 at either end, after the top end 62, 118, 130, 146 is removed. In connection with the control rod 190, it is contemplated that the liquid will behave in a manner where a meniscus will establish a dimple at least at the top end, adjacent to the top surface 66 of the composite assembly 40. Regardless of the manner of formation of one or more of the dimples 56, 68, it is contemplated that the dimples will assist with consolidation of the composite assembly 40 during the curing process.

During curing, which involves the application of pressure external to the composite assembly 40, the composite assembly 40 is understood to become consolidated. In other words, there is a slight compaction of the layers 10, 13 making up the composite assembly 40. The dimples 56, 68 are contemplated to assist with compaction, because the dimples permit the associated control rod 23, 24, 25, 28, 33, 34, 35, 46, 100, 120, 136, 168 to be compressed during the application of the external pressure.

In this regard, it is noted that the material selected for the control rods 23, 24, 25, 28, 33, 34, 35, 46, 100, 120, 136, 168, 190 also may be imbued with some degree of malleability. In other words, it is contemplated that the material selected for the control rod 23, 24, 25, 28, 33, 34, 35, 46, 100, 120, 136, 168, 190 may deform under the application of pressure (among other external forces, including temperature, for example) to assist with the compaction operation during curing.

In connection with the control rods 23, 24, 25, 28, 33, 34, 35, 46, 100, 120, 136, 168, 190, it is also contemplated that an epoxy may be provided in the aperture to further increase the adhesion between the control rod 23, 24, 25, 28, 33, 34, 35, 46, 100, 120, 136, 168, 190 and the interior walls of the aperture 44.

In connection with the embodiments of the control rod 23, 24, 25, 28, 33, 34, 35, 46, 100, 120, 136, 168, 190 described herein, it is contemplated that the material used for construction of the control rods 23, 24, 25, 28, 33, 34, 35, 46, 100, 120, 136, 168, 190 may be a high modulus material. High modulus materials are familiar to those skilled in the art and, therefore, additional discussion is not provided herein.

With respect to the thread pitch 134, 150 associated with one or more of the embodiments of the control rods 23, 24, 25, 28, 33, 34, 35, 46, 100, 120, 136, 168, it is contemplated for some embodiments that have more than one layer of composite fabric will fall within a single thread pitch 134, 150. With this construction, it is contemplated that the potential for delamination of adjacent fabric layers may be reduced.

As may be apparent from the foregoing, one aspect of the present invention is that the control rods 23, 24, 25, 28, 33, 34, 35, 46, 100, 120, 136, 168 may be manufactured with one length. After the top ends 62, 118, 130, 146 are removed, the control rods 23, 24, 25, 28, 33, 34, 35, 46, 100, 120, 136, 168 are properly sized for the aperture 44, regardless of the depth of the aperture 44.

As noted above, after the control rod 23, 24, 25, 28, 33, 34, 35, 46, 100, 120, 136, 168, 190 is inserted into the aperture 44, the composite assembly 44 is cured. During curing, the composite assembly 44 is subjected to compression and resin flows within and around the fabric layers that make up the composite assembly 40. During curing, therefore, resin flows into gaps and regions around the control rod 23, 24, 25, 28, 33, 34, 35, 46, 100, 120, 136, 168, 190 to further secure the control rod 23, 24, 25, 28, 33, 34, 35, 46, 100, 120, 136, 168, 190 within the aperture 44.

With respect to the various embodiments of the control rods 23, 24, 25, 28, 33, 34, 35, 46, 100, 120, 136, 168, 190 described herein, the widths of the control rods 23, 24, 25, 28, 33, 34, 35, 46, 100, 120, 136, 168, 190 are not considered to be critical to operation of the present invention. It is contemplated that the control rods 23, 24, 25, 28, 33, 34, 35, 46, 100, 120, 136, 168, 190 may have any suitable width as required or as desired. Moreover, for one specific construction of a composite assembly 40, there may be control rods 23, 24, 25, 28, 33, 34, 35, 46, 100, 120, 136, 168, 190 with large widths sparsely dispersed. In another specific construction of the composite assembly 40, the control rods 23, 24, 25, 28, 33, 34, 35, 46, 100, 120, 136, 168, 190 may have narrow widths and be compactly dispersed.

Figure 33:
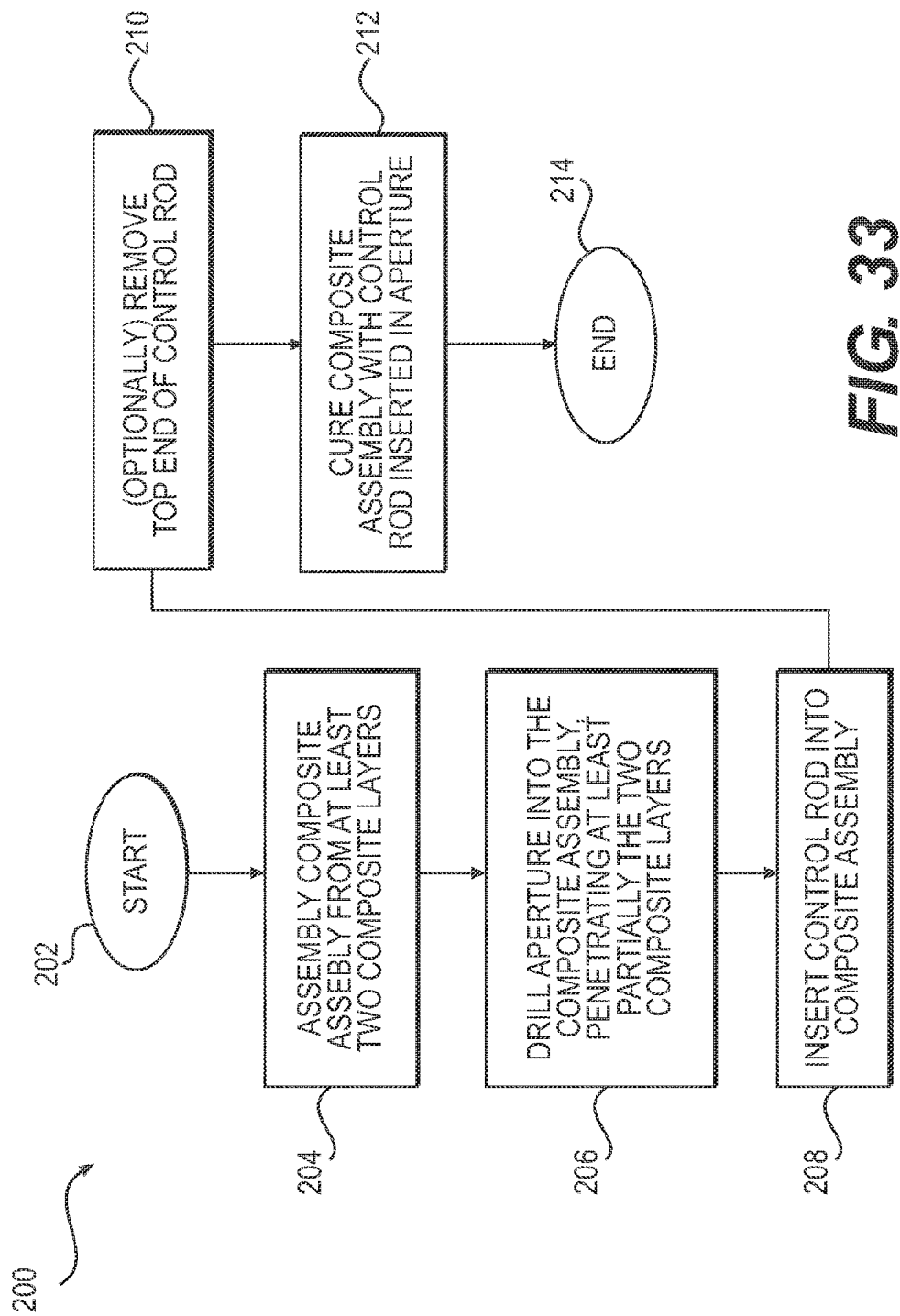
FIG. 33 is a flow chart outlining one contemplated method of curing a composite assembly together with one or more control rods according to the present invention.

FIG. 33 is a flow chart illustrating one contemplated method 200 according to the present invention. The method 200 encompasses a plurality of steps whereby a composite assembly 40 is cured together with one or more control rods 23, 24, 25, 28, 33, 34, 35, 46, 100, 120, 136, 168, 190 according to the present invention.

The method 200 begins at step 202.

From step 202, the method proceeds to step 204, where the composite assembly 40 is assembled from at least two composite layers, such as the composite fiber preforms 10, 13. As noted above, the composite fiber layers 10, 13 may be preimpregnated with resin or may be dry materials (i.e., without preimpregnation with resin).

From step 204, the method 200 proceeds to step 206, where the aperture 44 is drilled into the composite assembly. As illustrated in several of the figures, it is contemplated that the aperture 44 will penetrate at least partially through two of the composite layers. In particular, it is contemplated that the aperture will extend at least partially through the composite fiber preforms 10, 13. It is to be understood that the aperture 44 may be drilled to have different widths at different locations along the length of the aperture 44. For example, the aperture 44 may have a first width along an upper portion of the aperture 44 and a second width that is less than the first width along a bottom portion of the aperture 44.

From step 206, the method 200 proceeds to step 208 where a control rod 23, 24, 25, 28, 33, 34, 35, 46, 100, 120, 136, 168, 190 is inserted into the aperture 44 in the composite assembly 40.

Next, at step 210, which is an optional step (as discussed above), the top end 62, 118, 130, 146 of the control rod 23, 24, 25, 28, 33, 34, 35, 46, 100, 120, 136, 168 is cut off, leaving a dimple 68 at the top surface 66 of the composite assembly 40. In the case where the entirety of the control rod 23, 24, 25, 28, 33, 34, 35, 46, 100, 120, 136, 168, 190 is left in the aperture 44, this step 210 is omitted. Obviously, in the case of the control rod 190, there is no top end to remove since the control rod 190 is introduced into the aperture 44 in a liquid state.

As discussed above, when the top end 62, 118, 130, 146 of the control rod 23, 24, 25, 28, 33, 34, 35, 46, 100, 120, 136, 168 is cut off, it is contemplated that a dimple 68 will be formed in the bottom portion of the control rod 23, 24, 25, 28, 33, 34, 35, 46, 100, 120, 136, 168 remaining in the aperture. This dimple 68, as discussed, may assist with consolidation of the composite assembly 40 during the curing process. Alternatively, the top end 62, 118, 130, 146 of the control rod 23, 24, 25, 28, 33, 34, 35, 46, 100, 120, 136, 168 may be removed so that the bottom portion of the control rod 23, 24, 25, 28, 33, 34, 35, 46, 100, 120, 136, 168 is flush with the surface 66 of the composite stack 40.

Following optional step 210, the method 200 proceeds to step 212. At step 212, the composite assembly 40 is cured with the control rod 23, 24, 25, 28, 33, 34, 35, 46, 100, 120, 136, 168, 190 inserted in the aperture 44 therein. As noted above, resin may or may not be introduced into the composite assembly 40 during this step.

The method 200 ends at step 214.

The present invention has been described in connection with one or more embodiments. It is contemplated that features from one embodiment may be substituted for features in other embodiments without departing from the scope of the present invention. In addition, as should be apparent to those skilled in the art, there are numerous variations and equivalents of the embodiments that should be apparent to those skilled in the art. The present invention is intended to encompass those variations and equivalents, as if described herein.

What is claimed is:

1. A composite assembly, comprising:
   a first composite preform formed of a first plurality of fiber layers;
   a second composite preform formed of a second plurality of fiber layers, the second composite preform disposed atop the first composite preform; and
   a control rod disposed within an aperture within the first and second composite preforms, the control rod comprising
   a shaft defining an axis, and
   a plurality of threads disposed on the shaft, extending outwardly from the shaft,
   wherein the shaft comprises a thermoplastic material, and
   wherein the threads define a thread pitch that encompass more than one fiber layer from at least one of the first composite preform and the second composite preform,
   wherein the control rod forms a dimple in a surface of the composite assembly through removal of a top end of the control rod, and
   wherein a fillable cavity is formed beneath the control rod.

2. The composite assembly of claim 1, wherein the threads are helically disposed around the shaft at a predetermined thread angle.

3. The composite assembly of claim 1, wherein the threads are annularly disposed around the shaft, forming parallel rings spaced along the axis of the shaft.

4. The composite assembly of claim 1, wherein the shaft includes a top end with a head defining a keyway.

5. The composite assembly of claim 1, wherein the shaft comprises at least two expandable portions disposed adjacent to one another.

6. The composite assembly of claim 5, wherein the control rod further comprises a locking rod insertable between the expandable portions so that the threads engage walls of the aperture.

7. The composite assembly of claim 1, wherein the shaft comprises at least three expandable portions disposed adjacent to one another.

8. The composite assembly of claim 1, wherein:
   a first portion of the threads are helically disposed around a portion of the shaft at a predetermined thread angle, and
   a second portion of the threads are annularly disposed around expandable portions of the shaft, forming parallel rings spaced along the axis of the expandable portions of the shaft.

9. The composite assembly of claim 1, further comprising a top end that is removable therefrom.

10. The composite assembly of claim 1, wherein the control rod comprises a material with a melting point higher than a curing temperature of the resin.

11. The composite assembly of claim 1, wherein the shaft comprises a top end with a slot therein.

12. The composite assembly of claim 1, further comprising:
    an unthreaded part disposed along at least a portion of the shaft.

13. The composite assembly of claim 12, wherein the unthreaded part is disposed between two threaded parts along the shaft.

14. The composite assembly of claim 13, wherein the unthreaded part is disposed along a portion of the shaft intended to be located at a mating surface between the first composite preform and the second composite preform.

15. The composite assembly of claim 1, wherein the control rod further comprises:
a countersunk head at a top end thereof.

16. The composite assembly of claim 1, wherein the control rod is pre-treated with a release agent.

17. A composite assembly comprising:
a first composite preform;
a second composite preform in communication with the first composite preform;
a third composite preform in communication with the first composite preform and having a portion that overlaps the second composite preform; and
a control rod extending through the third composite preform, the second composite preform and at least partially through the first composite preform in a region where the third composite preform overlaps the second composite preform, the control rod comprising a thermoplastic material, wherein the control rod forms a dimple in a surface of the composite assembly through removal of a top end of the control rod, and wherein a fillable cavity is formed beneath the control rod.

18. The composite assembly of claim 17, wherein the first composite preform, second composite preform and third composite preform are co-cured together with the control rod in place.

19. The composite assembly of claim 17, wherein the control rod comprises at least one end portion having a concave dimple.

20. The composite assembly of claim 17, wherein the control rod secures the first composite preform, the second composite preform and the third composite preform together in an axial direction of the control rod.

21. The composite assembly of claim 20, wherein the control rod comprises a shaft having threads along at least a portion of the shaft.

\* \* \* \* \*